US009511988B2

(12) United States Patent
Hernandez et al.

(10) Patent No.: US 9,511,988 B2
(45) Date of Patent: Dec. 6, 2016

(54) TOUCH SCREEN FOR A BEVERAGE DISPENSING SYSTEM

(71) Applicants: George E. Hernandez, Selma, TX (US); Jeremiah A. Hong, San Antonio, TX (US)

(72) Inventors: George E. Hernandez, Selma, TX (US); Jeremiah A. Hong, San Antonio, TX (US)

(73) Assignee: Lancer Corporation, San Antonio, TX (US)

( * ) Notice: Subject to any disclaimer, the term of this patent is extended or adjusted under 35 U.S.C. 154(b) by 380 days.

(21) Appl. No.: 14/107,136

(22) Filed: Dec. 16, 2013

(65) Prior Publication Data

US 2014/0188271 A1    Jul. 3, 2014

Related U.S. Application Data

(60) Provisional application No. 61/848,216, filed on Dec. 27, 2012.

(51) Int. Cl.
| | | |
|---|---|---|
| B67D 1/08 | (2006.01) |
| G06F 3/0482 | (2013.01) |
| G06F 3/0485 | (2013.01) |
| G06F 3/0486 | (2013.01) |
| G06F 3/0488 | (2013.01) |

(52) U.S. Cl.
CPC ........... *B67D 1/0888* (2013.01); *G06F 3/0482* (2013.01); *G06F 3/0485* (2013.01); *G06F 3/0486* (2013.01); *G06F 3/04883* (2013.01)

(58) Field of Classification Search
CPC .................................................. B67D 1/0888
USPC ................................................. 700/232, 234
See application file for complete search history.

(56) References Cited

U.S. PATENT DOCUMENTS

| | | | | |
|---|---|---|---|---|
| 5,912,668 A | * | 6/1999 | Sciammarella | ..... G06F 3/04845 715/781 |
| 6,152,591 A | | 11/2000 | McCall et al. | |
| 6,466,237 B1 | * | 10/2002 | Miyao | ................... G06F 3/0483 707/E17.029 |
| 8,028,250 B2 | * | 9/2011 | Vronay | ................. G06F 3/0482 715/764 |
| 8,140,996 B2 | * | 3/2012 | Tomkins | ............... G06F 3/0485 715/730 |
| 8,307,306 B2 | * | 11/2012 | Komatsu | ............ H04N 5/44513 715/834 |
| D696,266 S | * | 12/2013 | d'Amore | ...................... D14/485 |
| 8,739,840 B2 | * | 6/2014 | Mattos, Jr. | ........... B67D 1/0888 141/94 |
| 8,757,222 B2 | * | 6/2014 | Rudick | ................ B67D 1/0888 141/198 |
| 9,046,685 B2 | * | 6/2015 | Nakada | ................ G02B 27/017 |
| 9,067,775 B2 | * | 6/2015 | Mattos, Jr. | ........... B67D 1/0888 |
| 9,218,704 B2 | * | 12/2015 | Lim | ...................... G07F 13/065 |

(Continued)

OTHER PUBLICATIONS

International Preliminary Report on Patentability, PCT/US2013/075612, Jul. 9, 2015; PCT/US2013/075612 claims priority to U.S. Appl. No. 14/107,136.

*Primary Examiner* — Michael K Collins
(74) *Attorney, Agent, or Firm* — Christopher L. Makay

(57) ABSTRACT

A beverage dispensing system includes a control system electrically connected with a beverage dispenser, a proximity sensor, and a touch-sensitive display. The control system causes the touch-sensitive display to display an advertising state when the proximity sensor indicates a user is not present at the beverage dispensing system and a beverage selection state when the proximity sensor indicates a user is present. The control system further causes the touch-sensitive display to display a pour state after a beverage choice selection is made through the touch sensitive display during the display of the beverage selection state. The control system still further causes the beverage dispenser to deliver the beverage choice after a pour request is made through the touch sensitive display during the display of the pour state.

38 Claims, 21 Drawing Sheets

(56) References Cited

U.S. PATENT DOCUMENTS

| | | | |
|---|---|---|---|
| 9,251,540 B1* | 2/2016 | Magee | G06Q 40/02 |
| 2002/0060228 A1 | 5/2002 | Nicol | |
| 2004/0155907 A1* | 8/2004 | Yamaguchi | G06F 3/0481 |
| | | | 715/810 |
| 2005/0279689 A1* | 12/2005 | Oranski | B67D 1/001 |
| | | | 210/198.1 |
| 2007/0114244 A1* | 5/2007 | Gatipon | B67D 1/0022 |
| | | | 222/129.1 |
| 2008/0183330 A1 | 7/2008 | Monn | |
| 2009/0100383 A1* | 4/2009 | Sunday | G06F 3/04883 |
| | | | 715/863 |
| 2010/0005427 A1* | 1/2010 | Zhang | G06F 3/011 |
| | | | 715/863 |
| 2010/0281374 A1 | 11/2010 | Schulz et al. | |
| 2011/0264284 A1* | 10/2011 | Rudick | B67D 1/0888 |
| | | | 700/283 |
| 2011/0315711 A1 | 12/2011 | Hecht et al. | |
| 2012/0239187 A1 | 9/2012 | Majer | |
| 2012/0253993 A1* | 10/2012 | Yoakim | A47J 31/52 |
| | | | 705/27.2 |
| 2013/0106690 A1* | 5/2013 | Lim | G07F 13/065 |
| | | | 345/156 |
| 2013/0245819 A1 | 9/2013 | Davenport et al. | |
| 2015/0058769 A1* | 2/2015 | Kim | G06F 3/04817 |
| | | | 715/765 |
| 2016/0101972 A1* | 4/2016 | Lim | G07F 13/065 |
| | | | 222/192 |

* cited by examiner

TOUCH SCREEN FOR A BEVERAGE DISPENSING SYSTEM

CROSS-REFERENCE TO RELATED APPLICATION

This present application claims all available benefit, under 35 U.S.C. §119(e), of U.S. provisional patent application Ser. No. 61/848,216 filed Dec. 27, 2012. By this reference, the full disclosure of U.S. provisional patent application Ser. No. 61/848,216 is incorporated herein as though now set forth in its entirety.

BACKGROUND OF THE INVENTION

1. Field of the Invention

The present invention relates generally to input systems, methods, and devices, and more particularly, to systems, methods, and devices for interpreting manual inputs in connection with touch-screens for drink dispensers.

2. Description of the Related Art

There currently exist various types of input devices for the selection of and activation of a pouring mechanism for a drink dispenser. The input devices may include: buttons, levers, and touch surfaces. The operations, for example, may correspond to moving a mechanical lever, pushing a mechanical button, moving a lever that activates a solenoid, or pushing a button that activates a solenoid.

The aforementioned methods are sufficient to display particular drinks and allow consumers to make a selection of their desired choice of beverage. However, manufacturers of drink dispensers want a more interactive experience for the consumer. A more interactive experience in the selection and activation of the drink dispenser aids in the advertising of the beverages and draws in and holds a consumer's interest. Aiding manufacturers of drink dispensers in their goal for a more interactive experience is the technology of touch screens. Touch screens are used in many electronic devices to display graphics and text, and to provide a user interface through which a user may interact with the devices. Accordingly, a drink dispenser that uses touch screen technology to provide an interactive and attractive display to advertise and aid the consumer with selection of beverages would be beneficial.

SUMMARY OF THE INVENTION

A beverage dispensing system includes a beverage dispenser adapted to deliver a dispensed beverage choice therefrom. A proximity sensor determines when a user is present at the beverage dispensing system. A touch-sensitive display displays one of an advertising state, a beverage selection state, and a pour state. A control system electrically connected with the beverage dispenser, the proximity sensor, and the touch-sensitive display controls the operation of the beverage dispensing system.

The control system displays the advertising state on the touch-sensitive display responsive to the proximity sensor indicating a user is not present at the beverage dispensing system. The control system displays the beverage selection state on the touch-sensitive display responsive to the proximity sensor indicating a user is present at the beverage dispensing system. The control system displays the pour state on the touch-sensitive display responsive to a selection of a beverage choice made through the touch sensitive display during the display of the beverage selection state. The control system operates the beverage dispenser to deliver the beverage choice responsive to a pour request made through the touch sensitive display during the display of the pour state.

The beverage selection state displayed on the touch-sensitive display includes a plurality of three-dimensional graphical representations of cups having thereon drink brand labels of beverage choice selections. The plurality of three-dimensional graphical representations of cups is movable in a progression through non-beverage selection positions and a beverage selection position. From the beverage selection state, the control system registers a contact with the touch-sensitive display at one of the plurality of three-dimensional graphical representations of cups and processes the contact to determine whether the contact is a stationary contact or a moving contact. The control system in response to a moving contact determines a starting point of the contact and an ending point of the contact among the non-beverage selection positions and the beverage selection position. The control system then progresses a contacted cup from the starting point of the contact to the ending point of the contact, thereby moving the contacted cup among the non-beverage selection positions and the beverage selection position. Alternatively, the control system progresses a contacted cup from a non-beverage selection position to the beverage selection position when the contact is a stationary contact and the contacted cup resides at a non-beverage selection position. The control system saves a contacted cup as a beverage choice selection when the contact is a stationary contact and the contacted cup resides at the beverage selection position.

The pour state displayed on the touch-sensitive display includes the three-dimensional graphical representation of the contacted cup having thereon the drink brand label of the beverage choice selection and a graphical representation for a pour button. The control system ceases the display of the beverage selection state responsive to the beverage choice selection and displays the pour state on the touch-sensitive display. From the pour state, the control system registers a contact with the touch-sensitive display at the graphical representation of the pour button and delivers the beverage choice selection from the beverage dispensing system in response to the contact with the graphical representation for the pour button.

The pour state displayed on the touch-sensitive display may further include at least one additive icon. The control system registers a contact with the additive icon and in response thereto displays on the touch-sensitive display the additive icon circling the three-dimensional graphical representation of the contacted cup. The control system in response to a contact with the graphical representation for the pour button delivers the beverage choice selection and additive from the beverage dispensing system.

The control system ceases the display of the beverage selection state in response to an expiration of a beverage choice selection time period and instead displays a beverage selection help state on the touch-sensitive display. The beverage selection help state displayed on the touch-sensitive display includes a three-dimensional graphical representation of a hand and a plurality of three-dimensional graphical representations of cups having thereon drink brand labels of beverage choice selections. The plurality of three-dimensional graphical representations of cups is movable in a progression through non-beverage selection positions and a beverage selection position. From the beverage selection help state, the control system displays on the touch-sensitive display the hand contacting one of the plurality of three-dimensional graphical representations of cups located at a non-beverage selection position. The control system then progresses the hand and the contacted cup from the non-beverage selection position to the beverage selection position and displays the hand and the contacted cup at the beverage selection position, thereby demonstrating a beverage choice selection.

The control system ceases the display of the pour state in response to an expiration of a pour time period and instead displays a pour help state on the touch-sensitive display. The pour help state displayed on the touch-sensitive display includes the three-dimensional graphical representation of a contacted cup having thereon a drink brand label of a beverage choice selection, a graphical representation for a pour button, and a three-dimensional graphical representation of a hand. From the pour help state, the control system displays on the touch sensitive display the hand contacting the graphical representation for the pour button, thereby demonstrating a beverage choice selection pour. The pour help state may further include at least one additive icon. When the pour help state includes at least one additive icon, the control system displays on the touch sensitive display the hand contacting the additive icon followed by the display of the additive icon circling the three-dimensional graphical representation of the contacted cup, thereby demonstrating an additive selection.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

Figure 1:
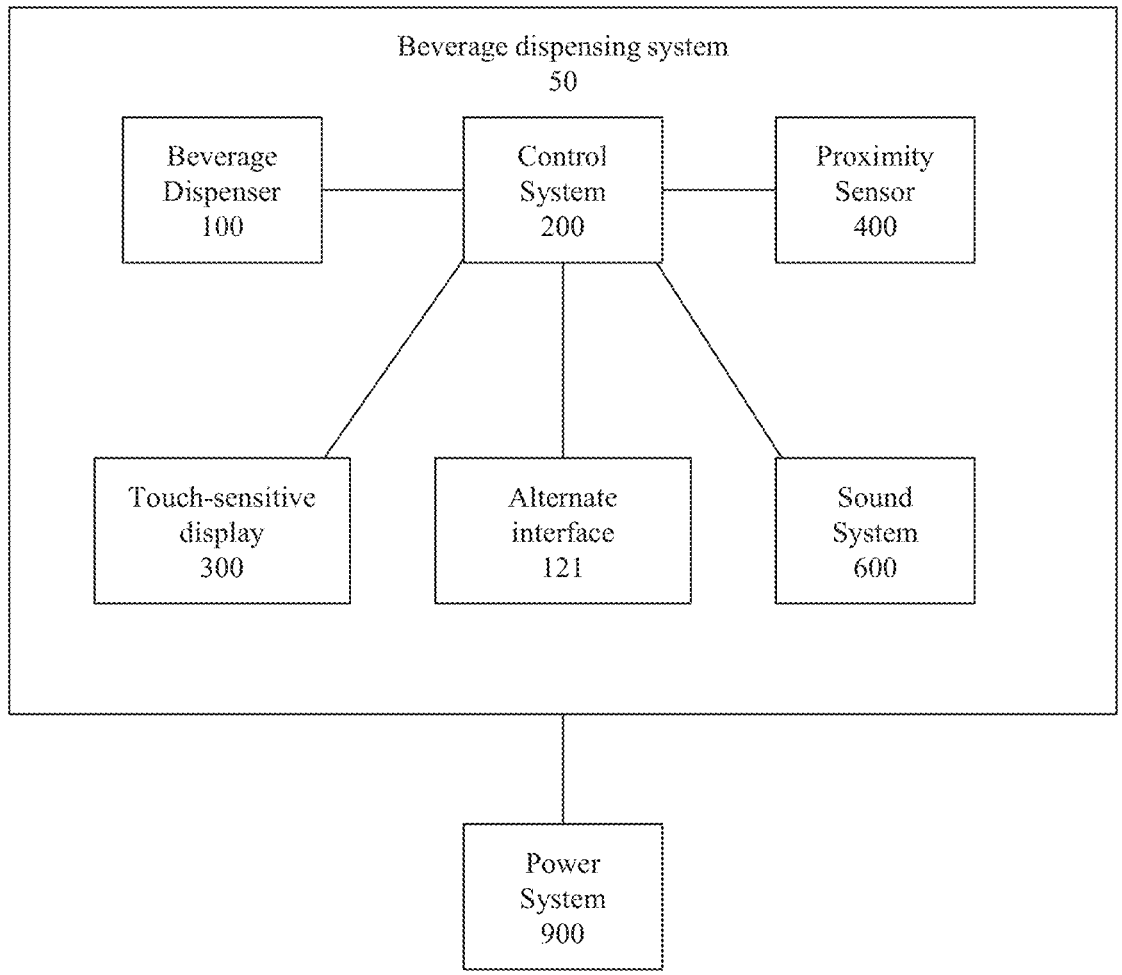
FIG. 1 is a relational block diagram of components for a beverage dispensing system according to the preferred embodiment.

FIG. 1 illustrates a relational block diagram of the components that comprise a beverage dispensing system 50. The beverage dispensing system 50 comprises a beverage dispenser 100, a control system 200, a touch-sensitive display 300, a sound system 600, alternate interface buttons 121, a proximity sensor 400, and a power system 900.

Figure 2:
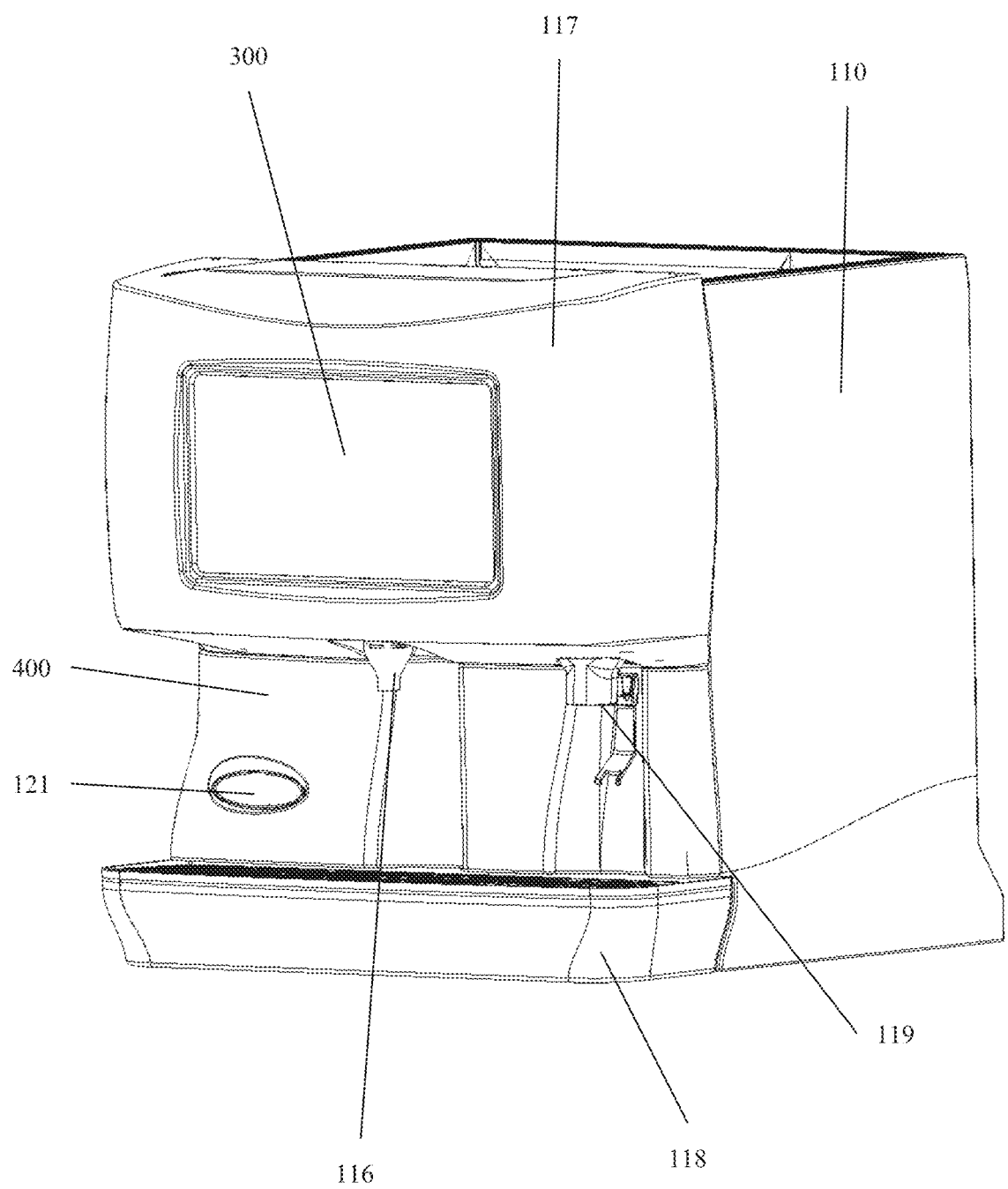
FIG. 2 is a perspective view illustrating a beverage dispenser of the beverage dispensing system with its cover.
Figure 3:
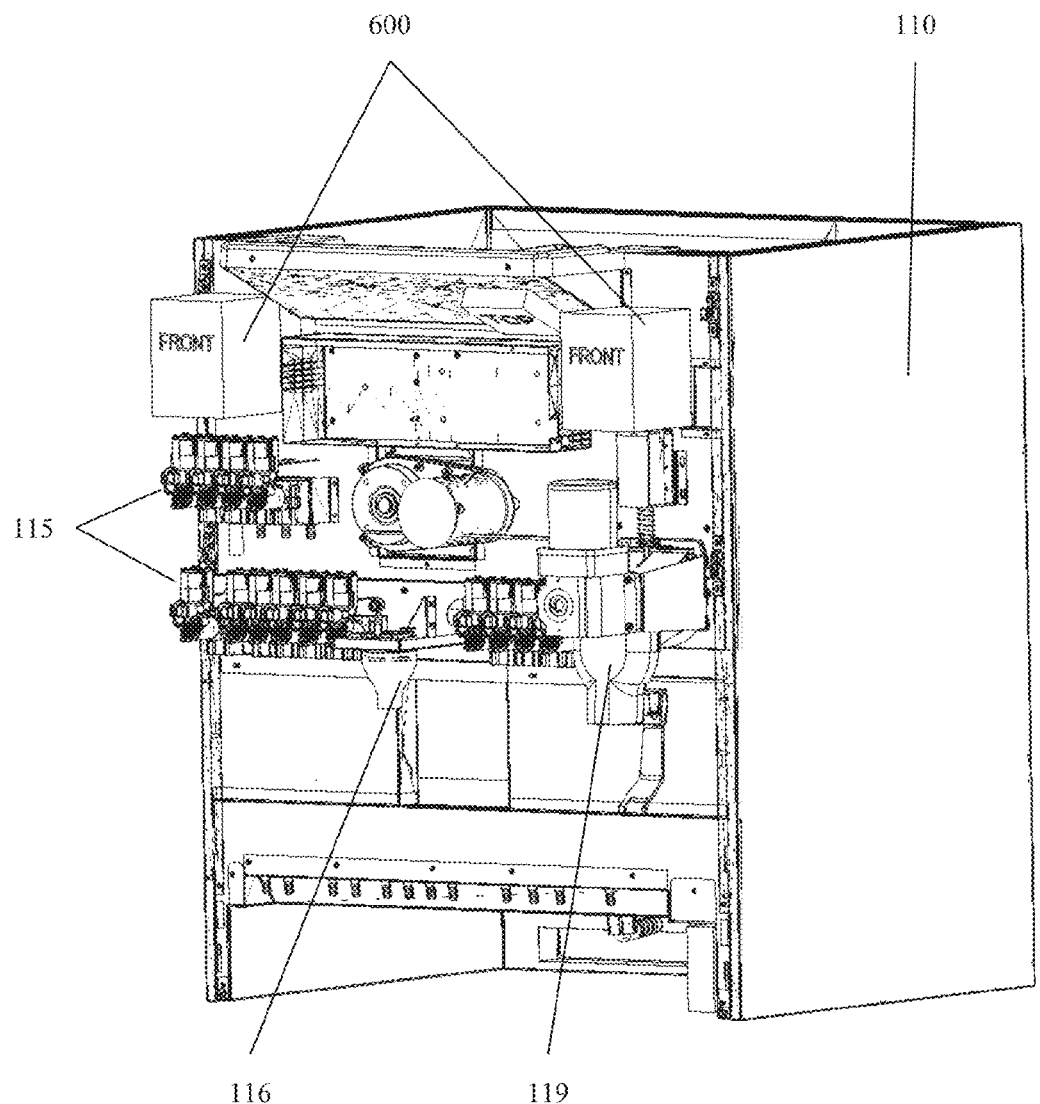
FIG. 3 is a perspective view illustrating the beverage dispenser of the beverage dispensing system without its cover.

FIGS. 2 and 3 illustrate the beverage dispenser 100. The beverage dispenser 100 is of a type well known to those of ordinary skill in the art that dispenses any suitable beverage. Beverage dispensers can be either pre-mix or a post-mix type, and, in the present embodiment, the beverage dispenser 100 is a post-mix type that dispenses fountain drinks. While the present embodiment discloses a post-mix beverage dispenser, the disclosed beverage dispenser is exemplary only, and those of ordinary skill in the art will recognize that any beverage dispenser may be employed in the beverage dispensing system 50 as the beverage dispenser 100. The beverage dispenser 100 includes a product source, a housing 110, dispensing valves 115, a nozzle 116, a cover 117, a drip tray 118, and an ice dispenser 119.

The housing 110 is rectangular in shape and provides the structure for the beverage dispenser 100. The housing 110 includes a chamber having a cooling system therein as well as an area for receiving and storing ice. The cooling system may be either a refrigeration unit that forms an ice bank or a cold plate. When the cooling system comprises a refrigeration unit, the cooling system electronically communicates and is controlled by the control system 200. The control system 200 controls the cooling system to regulate temperature within the beverage dispenser 100 and to ensure that beverages are delivered to an end user at the appropriate temperature. In the present embodiment of the invention, the beverage dispenser 100 uses a cold plate to cool incoming water, carbonated water, and product. The cold plate may be manufactured from any suitable material, but, in the present embodiment, the cold plate is made from aluminum. Ice delivered into the chamber contacts the cold plate to affect the heat transfer necessary for the cooling of water, carbonated water, and product flowing through the cold plate.

In the present embodiment of the invention, the beverage dispenser 100 receives product from a product source, water from a water source, and carbonated water from a carbonated water source for the purpose of delivering product and either plain or carbonated water to an end user in the production of a fountain drink. The product source is syrup that is contained in bags that are packaged in boxes herein referred to as bags in a box. The bags in a box are stored on racks located near the beverage dispenser 100. The number and type of bags in a box correspond to the number and type of flavors desired for a particular use. Water from the water source can be from any suitable source such as a public water source. The carbonated water source is typically a carbonator coupled with a water source and a source of carbon dioxide gas.

The water from the water source, the carbonated water from the carbonated water source, and the product from the product source are delivered by pumps and travel via supply lines into the beverage dispenser 100. The pumps electronically communicate and are controlled by the control system 200. The control system 200 controls the pumps to deliver via the supply lines the water, carbonated water, and product to the beverage dispenser 100. After entering the beverage dispenser 100, the supply lines connect with supply lines of the cooling system 150, which, in the present embodiment, are supply lines housed within the cold plate. As the product, water, and carbonated water travel through the cold plate, the cold plate cools the product, water, and carbonated water prior to delivery to the dispensing valves 115 via further supply lines within the beverage dispenser 100.

The dispensing valves 115 attach to the housing 110 of the beverage dispenser 100 and can be of any suitable type such as electronic solenoid, volumetric valves, or any valve capable of providing regulated fluid flow. The number of dispensing valves 115 corresponds to the number of different flavors that is desired in the end use application. The dispensing valves 115 electronically communicate and are controlled by the control system 200. The control system 200 controls the dispensing valves 115 to deliver the appropriate amounts of water, carbonated water, product, and any desired additives to make a suitable fountain drink. The dispensing valves 115 connect to a nozzle or nozzles 116 which delivers the product and one of the water and carbonated water from the beverage dispenser 100. In the present embodiment of the invention, the nozzle 116 is a multi-flavor nozzle of a type well known to one of ordinary skill in the art.

The cover 117 fits over the beverage dispenser 100 and can be made of any suitable material. The cover 117 provides an aesthetic appeal by concealing the components of the beverage dispenser 100 from the end user. The drip tray 118 is placed under the nozzle 116 and is designed to catch any liquid that unintentionally escapes the nozzle 116 or that is spilled by the end user.

The ice dispenser 119 is included in the present embodiment of the invention to allow the inclusion of ice in a dispensed beverage. Ice is added to the beverage dispensing system 50 using any suitable method such as pouring ice into the beverage dispenser 100 or an ice maker mounted atop the beverage dispenser 100. Ice within the chamber is stored for later dispensing in the ice storage area of the ice chamber 111 or travels onto the cold plate for use in cooling the product, water, and carbonated water.

Figure 4:
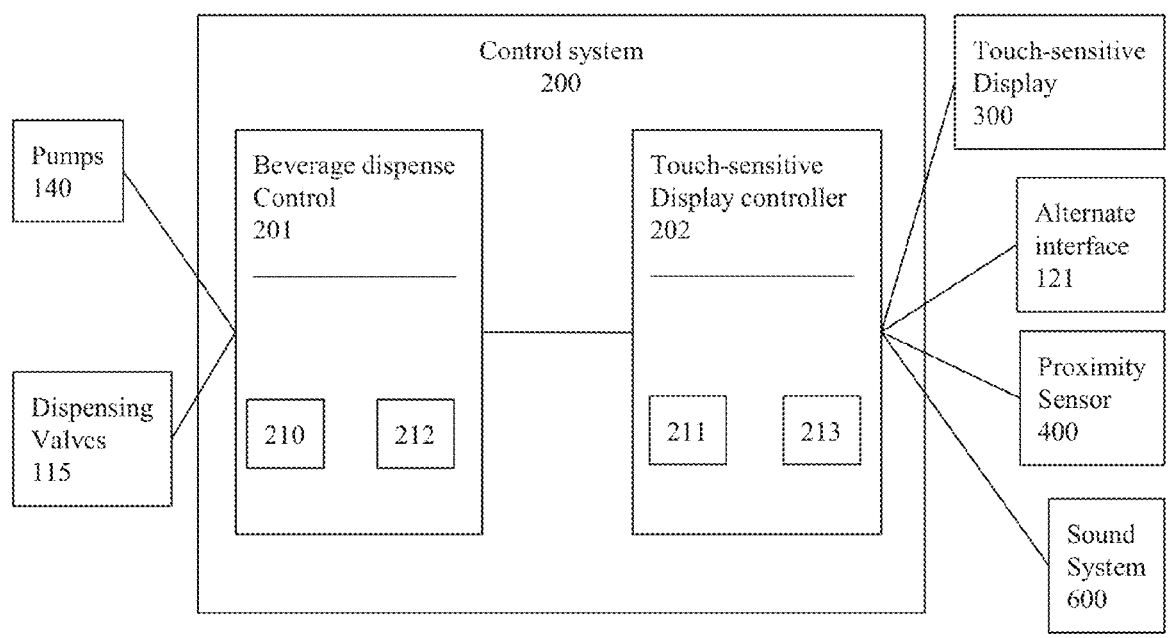
FIG. 4 is a relational block diagram of components for a control system of the beverage dispensing system.

FIG. 4 is a block diagram that illustrates the components of the control system 200. The control system 200 is electrically connected and communicates with the components of the beverage dispensing system 50. The purpose of the control system 200 is to monitor and control the operation of the beverage dispenser 100, the touch-sensitive display 300, the sound system 600, the alternate interface buttons 121, and the proximity sensor 400 if included. In particular, the control system 200 receives user input and processes the user input to deliver a selected beverage to a user including any selected additives. The control system 200 may also distribute power throughout the beverage dispensing system 50. The control system 200 includes a beverage dispenser controller 201 and a touch-sensitive display controller 202 that electronically communicate with each other in order to take inputs from and dispense beverages to an end user. In the present embodiment of the invention, the control system 200 includes a beverage dispenser controller 201 and a touch-sensitive display controller 202, however, it should be understood by those of ordinary skill in the art that a single controller or multiple controllers may be used.

The beverage dispenser controller 201 includes a microcontroller 210 and a memory 212. The beverage dispenser controller 201 receives inputs from and gives outputs to the various components of the beverage dispenser 100, including the pumps 140 and the dispensing valves 115. The microcontroller 210 may be of any type microcontroller, CPU, microprocessor, and the like suitable to control the beverage dispenser 100. The microcontroller 210 of the beverage dispenser controller 201 retrieves and executes programs stored within the memory 212. The memory 212 of the beverage dispenser controller 201 may include any suitable RAM or ROM memory device that can store computer programs such as magnetic disks or flash memory devices. The present embodiment uses a replaceable flash memory device such as a USB flash drive for the memory 212. The USB flash drive allows a technician to change the settings of the beverage dispenser 100 by changing programs within the USB flash drive or by replacing the USB flash drive altogether. The beverage dispensing system 50 can also be connected to a wi-fi network wherein programs and settings within the memory 212 of the beverage dispenser controller 201 can be changed remotely via the Internet.

The touch-sensitive display controller 202 includes a microcontroller 211 and a memory 213. The touch-sensitive display controller 202 receives inputs from and gives outputs to the various components, including, the beverage dispenser controller 201, the touch-sensitive display 300, the alternate interface buttons 121, the sound system 600, and the proximity sensor 400. The microcontroller 211 may be of any type microcontroller, CPU, microprocessor, and the like suitable to control the electronic systems. The microcontroller 211 of the touch-sensitive display controller 202 retrieves data files and executes programs stored within the memory 213. The memory 213 of the beverage dispenser controller 201 may include any suitable RAM or ROM memory device that can store computer programs such as magnetic disks or flash memory devices. The present embodiment uses a replaceable flash memory device such as a USB flash drive for the memory 213. The USB flash drive allows an operator to change the settings of the beverage dispenser 100 by changing programs within the USB flash drive or by replacing the USB flash drive card altogether. It should be noted that the beverage dispensing system 50 can also be connected to a wi-fi network wherein programs and settings within the memory 213 of the touch-sensitive display controller 202 can be changed remotely via the Internet.

Figure 17:
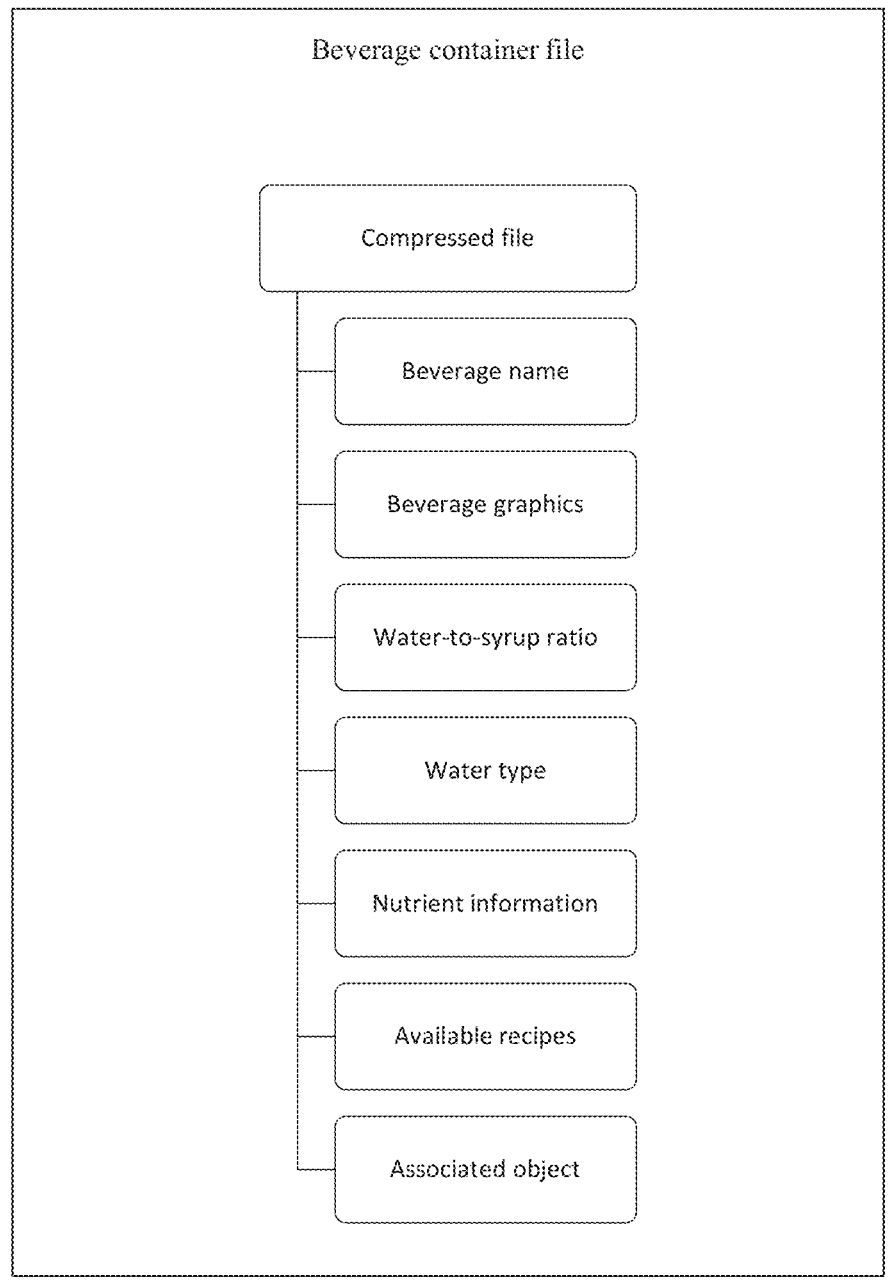
FIG. 17 illustrates a beverage container file within a memory of the beverage dispensing system.

The beverage dispenser controller 201 and the touch-sensitive display controller 202 electronically communicate with each other in order to take inputs from and dispense beverages to an end user. The touch-sensitive display controller 202 receives inputs from and gives outputs to the touch-sensitive display 300 in order to determine a user beverage selection, including any additives. Once a user beverage selection, including any additives, has been determined, the touch-sensitive display controller 202 communicates with the beverage dispenser controller 201, which, in turn, controls the appropriate pumps 140 and dispensing valve 115 to deliver the selected beverage. In order for the beverage dispenser controller 201 and the touch-sensitive display controller 202 to deliver desired beverages and additives, the touch-sensitive display controller 202 must have access to beverage files containing information on all beverages suitable for dispensing from the beverage dispensing system 50. FIG. 17 illustrates a beverage information file stored within the memory 213 for the touch-sensitive display controller 202. In particular, a beverage information file includes the beverage name, such as Coca-Cola™, Sprite™, and the like; the graphics associated with the beverage; the water-to-syrup ratio of the beverage; the water type of the beverage, such as carbonated or plain; the nutrient information of the beverage; the available recipes of the beverage, such as the additives available for delivery during the pouring of the beverage; and an associated object for the beverage, which is an icon for display on the touch-sensitive display 300. Whenever a beverage is selected for dispensing from a dispensing valve 115, the touch-sensitive display controller 202 accesses the beverage information file for the beverage in order to display on the touch-sensitive display 300 a correct icon with associated graphics as well as the available additives. In addition, the touch-sensitive display controller 202 accesses the beverage information file for the beverage in order to provide the correct beverage delivery information, such as water-to-syrup ratio, to the beverage dispenser controller 201.

The touch-sensitive display 300 provides an interface between the user and the beverage dispensing system 50. The touch-sensitive display 300 provides a touch sensitive surface that allows the user to make beverage selections or "inputs" based on contact (such as from the user's finger) and it also displays graphical "output." The graphical "output" shown on the touch-sensitive display 300 aids the user in selecting a beverage and also provides the vendor with an advertising function if so desired. In the preferred embodiment of the invention, the touch-sensitive display 300 is any suitable device that generates an output signal responsive to contact from a user such as a resistive, capacitive, or a surface acoustic wave system. Contacts or inputs from the user result in the touch-sensitive display 300 outputting signals to the touch-sensitive display controller 202.

The beverage dispenser 100 includes alternate interface buttons 121 as an additional user interface for the beverage dispensing system 50. The alternate interface buttons 121 electronically communicate with the touch-sensitive display controller 202 and allow full operation of the beverage dispensing system 50. The alternate interface buttons 121 are located on the housing 110 of the beverage dispenser 100 and allow an end user to manually operate the beverage dispensing system 50 if the end user cannot use the touch-sensitive display 300 or the touch-sensitive display 300 becomes inoperable. For example, if an end user is a child or a person in a wheel chair, the alternate interface buttons 121 provide an interface located on the beverage dispensing system 50 beneath the touch-sensitive display 300.

The beverage dispensing system 50 includes a sound system 600 that works in conjunction with the touch-sensitive display 300 to attract consumers and to aid users in the process of selecting beverages. In the present embodiment, the sound system 600 may be any suitable sound device such as speakers. The sound system 600 electronically communicates and is controlled by the touch-sensitive display controller 202. By providing additional stimulus to potential consumers, the sound system 600 aids the operator in advertising or attracting consumers to the beverage dispensing system 50. For example, when the touch-sensitive display 300 is outputting advertising material, the sound system 600 can work in conjunction with the touch-sensitive display 300 to accentuate advertising by attracting potential consumers with sound. In addition, the sound system 600 can aid visually impaired end-users by working in conjunction with the alternate interface buttons 121 to guide them through and help them to select beverages.

The beverage dispensing system 50 includes a proximity sensor 400. The purpose of the proximity sensor 400 is to detect the presence or absence of a nearby consumer in relation to the beverage dispensing system 50 so that the touch-sensitive display controller 202 may transition the touch sensitive display 300 from an advertising state to a beverage selection state. The proximity sensor 400 detects the presence or absence of nearby consumers using any suitable means such as infrared, acoustic, or capacitive proximity switches. The proximity sensor 400 is in communication with the touch-sensitive display controller 202. When the proximity sensor 400 detects the presence or absence of a potential consumer a signal is sent to the touch-sensitive display controller 202. The touch-sensitive display controller 202 interprets the signal from the proximity sensor 400 and places the touch-sensitive display 300 into the appropriate state.

The beverage dispensing system 50 connects with and receives power from any suitable source such as a standard electrical outlet to provide power to the components of the beverage dispensing system 50. As such, the beverage dispensing system 50 includes power transfer devices, such as regulators, rectifiers, and transformers that supply the components of the beverage dispensing system 50 with their required voltage and current levels.

A graphical user interface or GUI presented on the touch-sensitive display 300 allows a user to operate the beverage dispensing system 50. The GUI of the beverage dispensing system 50 uses graphical icons to guide the user through the beverage selection process. In the present embodiment these graphical icons are three-dimensional highlighted areas and familiar shapes such as graphical representations of cups to provide an interface that allows the selection of beverages to be unique and entertaining. When the user manipulates the graphical icons displayed on the touch-sensitive display 300, they are able to communicate directly with the touch-sensitive display controller 202. Operation of the GUI is explained below.

Figure 5:
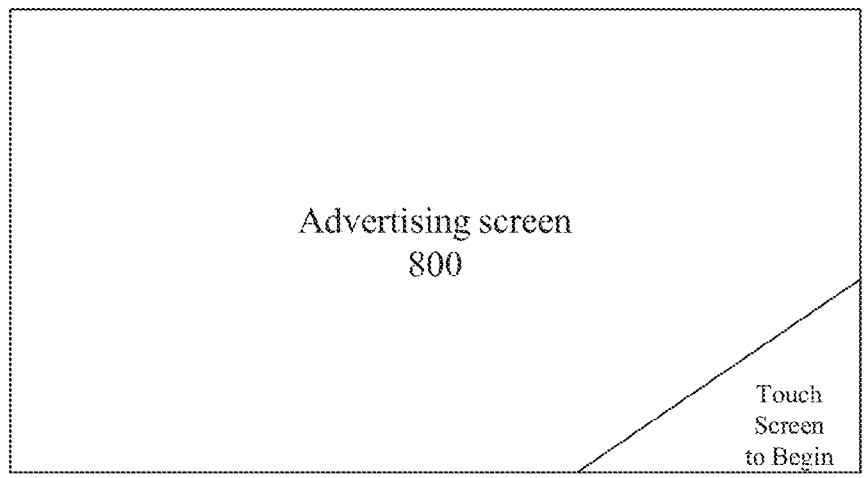
FIG. 5 illustrates an advertising screen for the beverage dispensing system.
Figure 6:
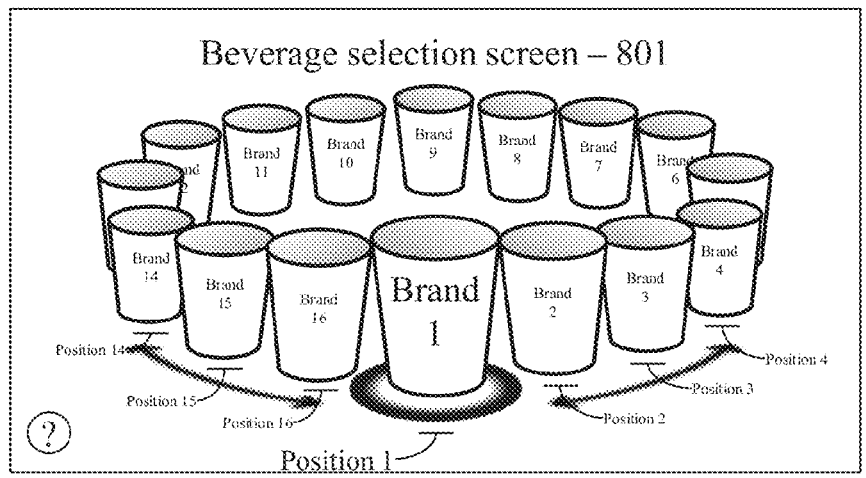
FIG. 6 illustrates a beverage selection screen for the beverage dispensing system.
Figure 7:
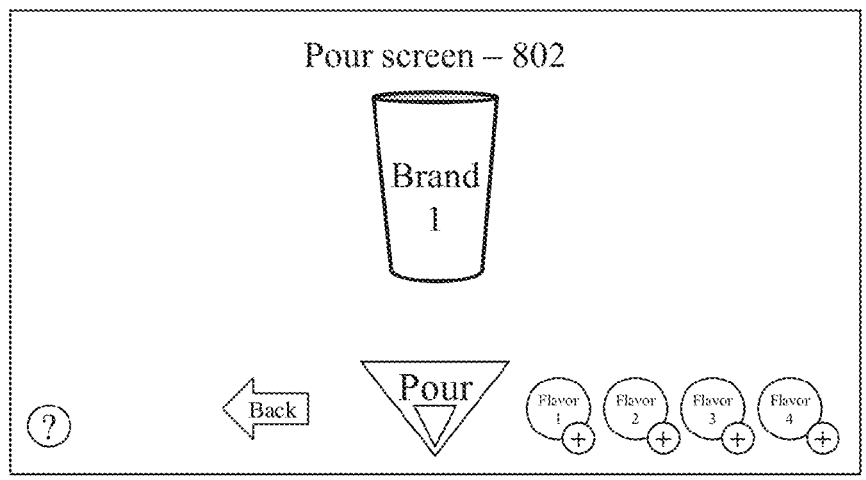
FIG. 7 illustrates a pour screen for the beverage dispensing system.
Figure 8A:
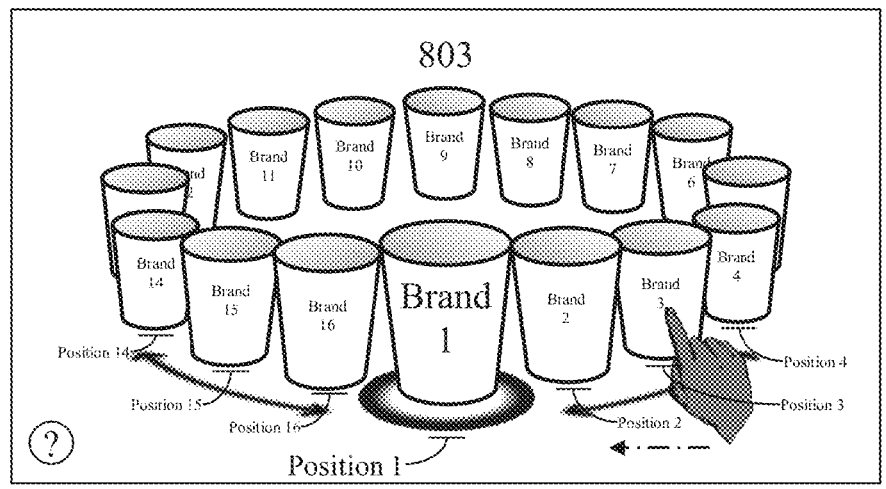
FIGS. 8a-8c illustrate beverage selection state help screens for the beverage dispensing system.
Figure 8B:
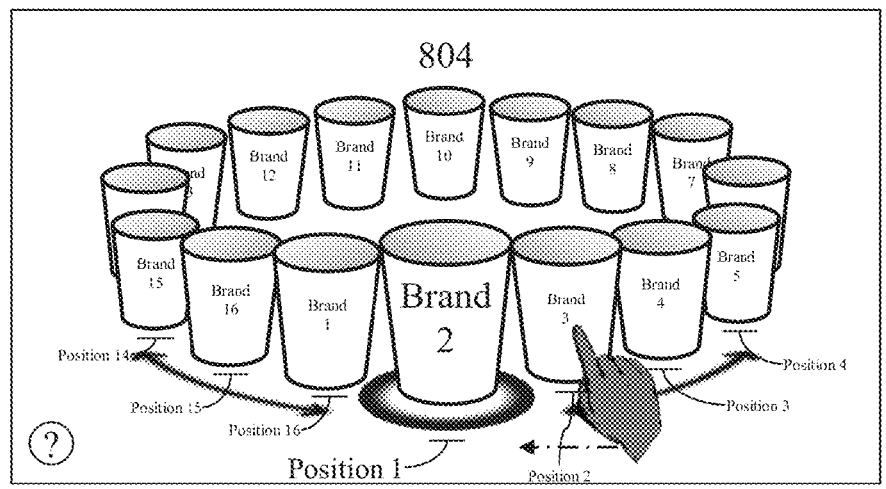
Figure 8C:
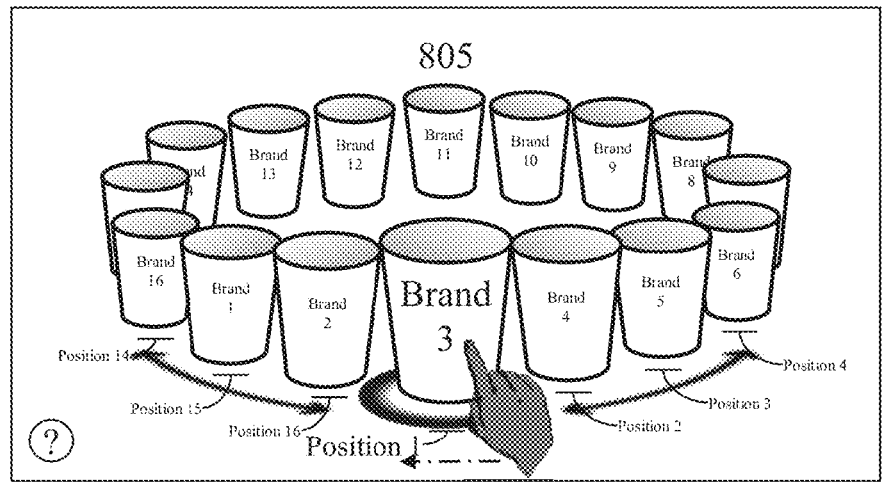
Figure 9A:
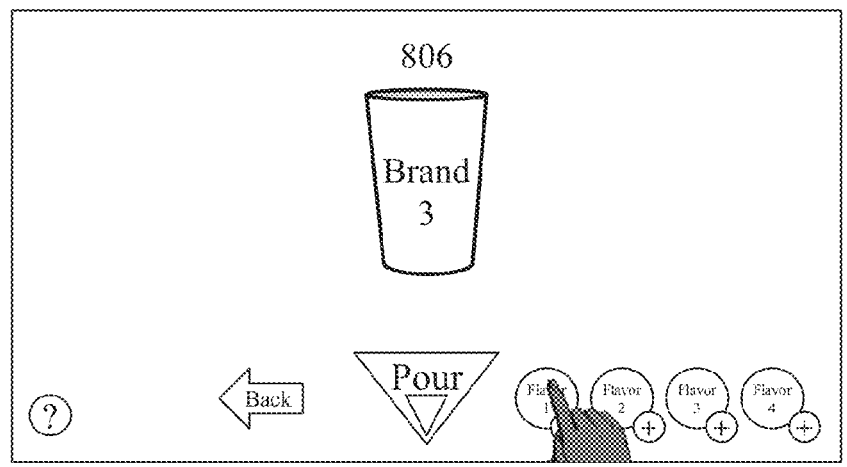
FIGS. 9a-9e illustrate pour state help screens for the beverage dispensing system.
Figure 9B:
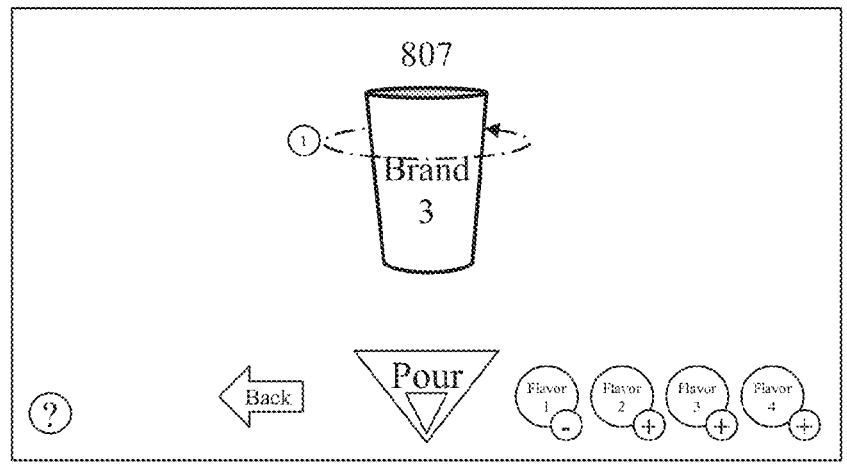
Figure 9C:
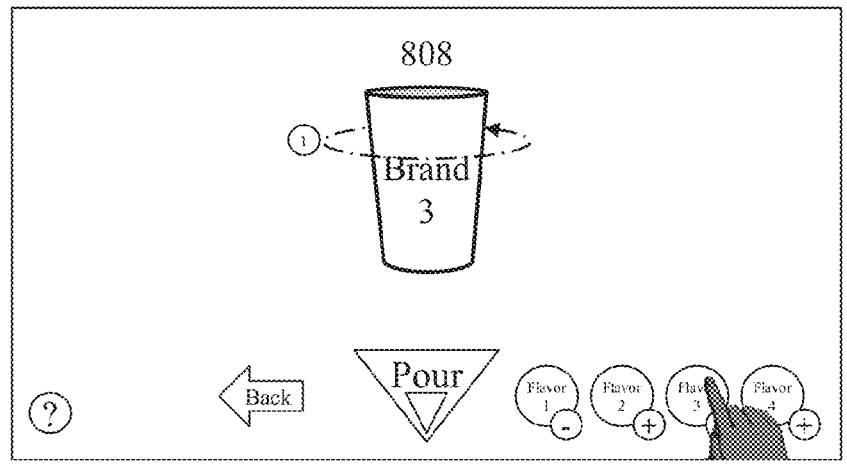
Figure 9D:
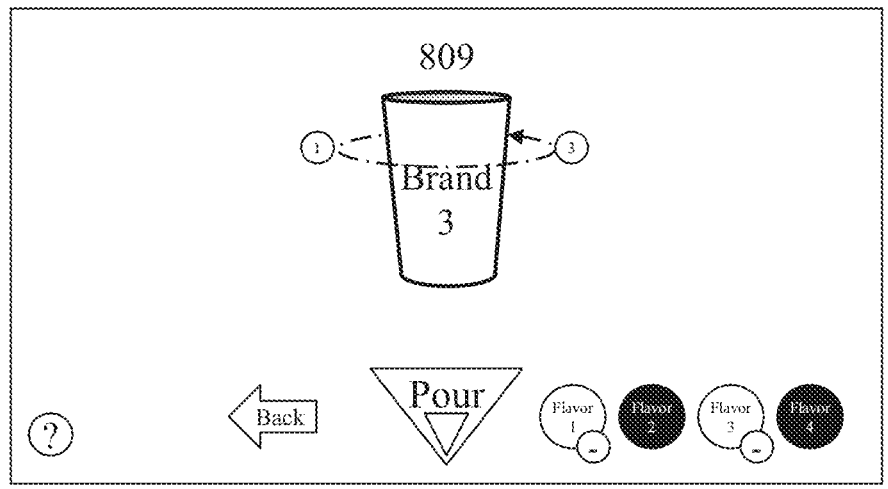
Figure 9E:
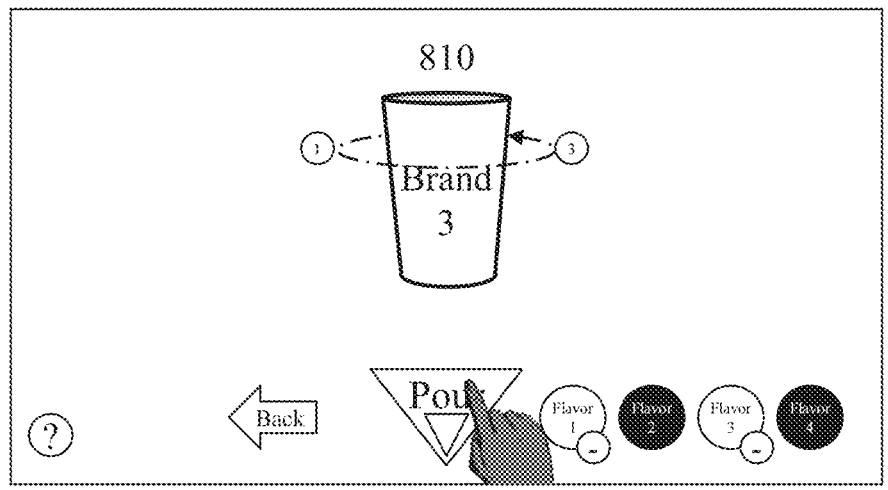

When the user selects a graphical icon displayed on the touch-sensitive display 300, signals are sent to the touch-sensitive display controller 202. Programs within the memory 213 of the touch-sensitive display controller 202 interpret signals from the touch-sensitive display 300 as command inputs. The touch-sensitive display controller 202 analyzes the command inputs from the user to determine the nature of each, input. This includes the size, shape, and location of the affected area on the touch-sensitive display 300. In addition, the touch-sensitive display controller 202 analyzes movement from the user. Illustratively, if the user moves their finger along the touch-sensitive display 300, the touch-sensitive display controller 202 calculates the difference between the starting point and the ending point of the command input. After interpreting the command inputs, the touch-sensitive display controller 202 in turn outputs signals to the touch-sensitive display 300 that modify the GUI and aid the user in making beverage selections. Examples of the output from the touch-sensitive controller 202 include changing from a beverage selection screen to a pour screen after a beverage selection, or moving graphical icons on the touch-sensitive display 300 in response to inputs from the user. The GUI of the beverage dispensing system 50 includes an advertising state, a beverage selection state, a pour state, a help state, and a maintenance state that are presented on the touch-sensitive display 300. FIG. 5 illustrates an advertising screen 800 that is an example screen within the advertising state. In the preferred embodiment, the advertising state is the default state of the GUI. The advertising state uses audio projected through the sound system 600 and video displayed on the touch-sensitive display 300 to present advertising and to capture the attention of nearby consumers. FIG. 6 illustrates a beverage selection screen 801 that is an example screen within the beverage selection state. The beverage selection state presents the user with a menu that displays beverage choices that are graphically represented as cups or any other suitable beverage container, such as a can or bottle. Users can make beverage selections by choosing a cup that represents their beverage of choice. FIG. 7 illustrates a pour screen 802 that is an example screen within the pour state. The pour state allows the user to select additional additives poured with their beverage, return to the beverage selection state, or to pour the beverage of their choice. FIGS. 8a-8c illustrate beverage selection help screens 803-805 and FIGS. 9a-9e illustrate pour state help screens 806-810 that are example screens within the beverage selection help state and the pour help state. The beverage selection help state and the pour help state use animations to demonstrate how to operate the GUI of the beverage dispensing system 50. Specifically, the beverage selection help state and the pour help state use an animated hand to operate the GUI and demonstrate how to select beverages and additives and pour a beverage. FIGS. 18a-18f illustrate maintenance screens that are example screens within the maintenance state. The maintenance state allows a technician to perform diagnostics on the beverage dispensing system 50 and input operating parameters for the beverage dispensing system 50, such as beverage and additive flavors and the like. The beverage dispensing system 50 transitions from the advertising state to the beverage selection state based upon the proximity sensor 400 or user input. The beverage dispensing system 50 transitions among the beverage selection state, the pour state, and the help states based on user input or the expiration of a timing program located within the memory 213. In addition, the beverage dispensing system 50 transitions from the beverage selection state, the pour state, and the help states to the advertising state based upon the expiration of a global timing program located within the memory 213. The beverage dispensing system 50 transitions to the maintenance state 504 based upon technician input.

As stated above, the advertising state is the default state of the beverage dispensing system 50. As a user approaches the beverage dispensing system 50, the user will be presented with the advertising screen 800 illustrated in FIG. 5. The advertising screen 800 will display advertising and operate in combination with the sound system 600 to attract a user's attention. The advertising screen 800 includes the words "Touch Screen to Begin" that invite a user to touch the touch-sensitive display 300 and therefore operate the beverage dispensing system 50. As a user comes within range of the proximity sensor 400 or activates the touch-sensitive display 300 with contact, the beverage dispensing system 50 will exit the advertising state and enter the beverage selection state. The interaction between the proximity sensor 400, the touch-sensitive display controller 202, and the touch-sensitive display 300 to transition the beverage dispensing system 50 from the advertising state to the beverage selection state will be described in greater detail herein.

Upon transitioning to the beverage selection state, the touch-sensitive display controller 202 controls the touch-sensitive display 300 of the beverage dispensing system 50 to display the beverage selection screen 801 illustrated in FIG. 6. In order to display a beverage selection screen, the touch-sensitive display controller 202 accesses a beverage information file for each beverage of the beverage dispensing system 50 such that a correct associated object and beverage graphic is displayed. In the present embodiment, the beverage selection screen 801 has associated objects in the form of a display of cup icons that allows a user to select a beverage for dispensing from the beverage dispenser 100. Moreover, the cup icons displayed by the beverage selection screen 801 include a beverage graphic representing the choices among the different beverages. For example, the cup icons display the labels of particular drink brands such as Coke™, Sprite™, Dr Pepper™, Powerade™, and the like. The cup icons within the beverage selection screen 801 are programmable in that a technician for the beverage dispensing system 50 can change the brands and the numbers of cup icons depending upon application. Although the preferred embodiment employs cup icons, those of ordinary skill in the art will recognize that other suitable beverage container icons such as cans or bottles could be used.

The beverage selection screen 801 in the preferred embodiment includes 16 cup icons that represent beverage selections. The cup icons are arranged in and movable either clock-wise or counter clock-wise through a circular pattern having 16 positions including a beverage selection position located at position 1. While the preferred embodiment of the invention includes 16 cup icons, it should be understood by those of ordinary skill in the art that more or less cup icons representing more or less beverage selections may be added or removed depending upon application. In order to choose a beverage for dispensing, the user must first move the cup icon representing their beverage of choice into the beverage selection position followed by a selection input, which, in the preferred embodiment is a tap of the cup icon. To aid the user in making beverage selections, the graphical size of the cup icons increases or decreases depending upon position. The graphical size of the cup icon located in the beverage selection position (position 1) is largest and most prominently displayed in front of the user, whereas the cup icon located in position 9 is the smallest. As cup icons move away from the beverage selection position (position 1) towards position 9, the graphical size of the cup icons decreases.

Figure 10A:
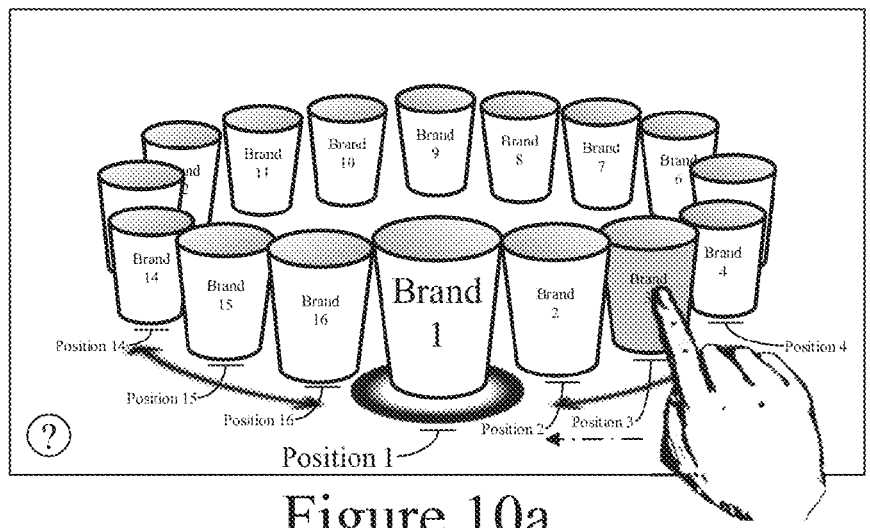
FIG. 10a illustrates a user selection of a beverage icon located in position 3.
Figure 10B:
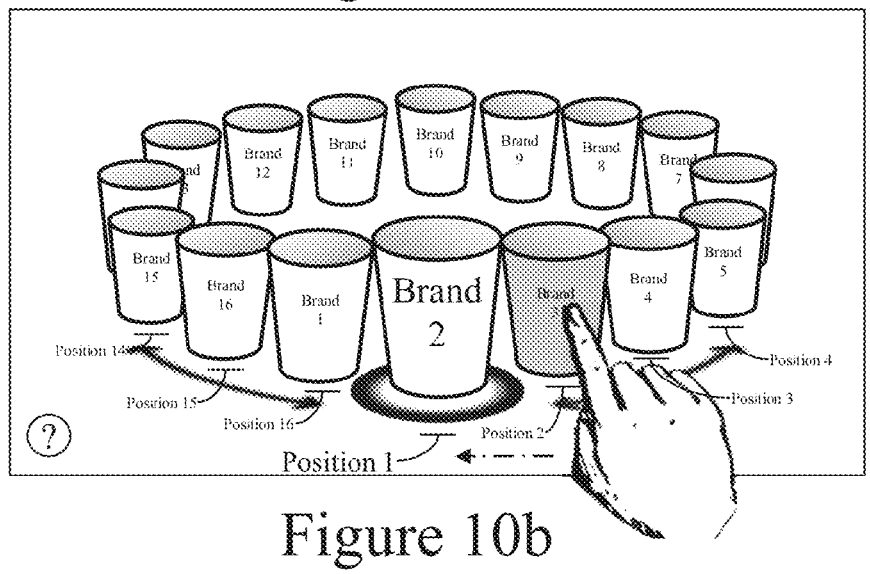
FIG. 10b illustrates a user moving the beverage icon selected in position 3 to position 2.
Figure 10C:
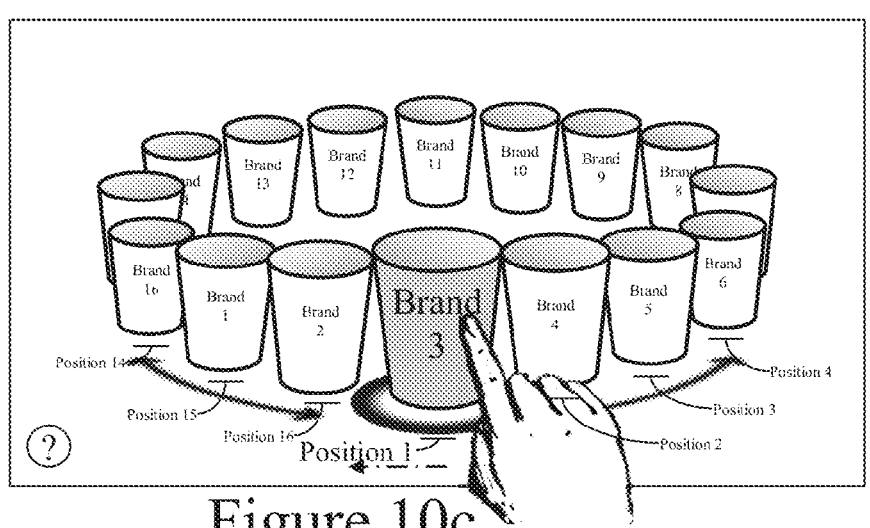
FIG. 10c illustrates a user moving the beverage icon selected in position 3 from position 2 to position 1.

FIGS. 10a-10c provide an example movement of a cup icon among the positions of the beverage selection screen 801. In particular, FIGS. 10a-10c illustrate the selection of a beverage of choice represented by cup icon 3 located in position 3. In order to move cup icon 3 located in position 3 to the beverage selection position (position 1), the user first touches the cup icon 3 as illustrated in FIG. 10a. The user will then move the cup icon 3 located at position 3 to the beverage selection position (position 1) by dragging the cup icon 3 in a clock-wise direction until it reaches the beverage selection position (position 1). As illustrated in FIGS. 10b and 10c, the cup icon 3 will first move from position 3 to position 2 followed by the movement of the cup icon 3 from position 2 to the beverage selection position (position 1). As the cup icon 3 moves from position 3 to position 2 the graphical size of the cup icon 3 increases. Similarly, as the cup icon 3 moves from position 2 to position 1 the graphical size of the cup icon 3 again increases and will reach its largest graphical size and is prominently displayed in front of the user.

Figure 11A:
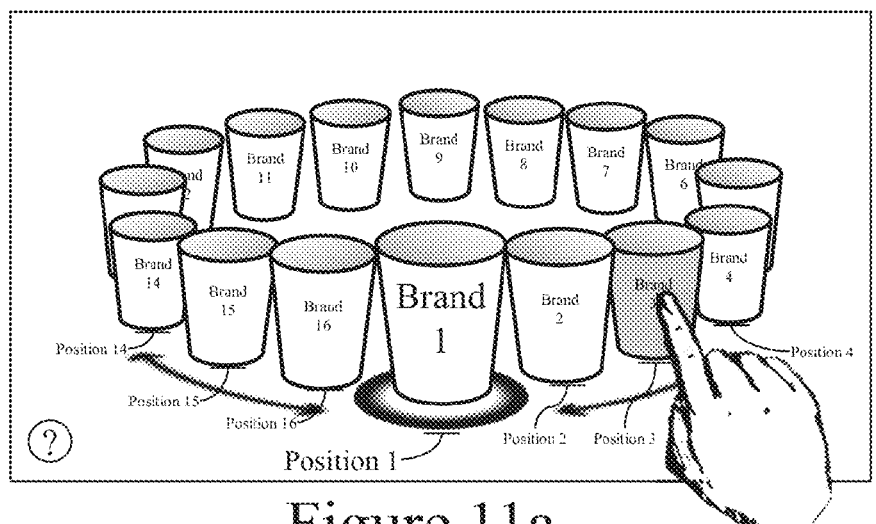
FIG. 11a illustrates a user direct selection of a beverage icon located in position 3.
Figure 11B:
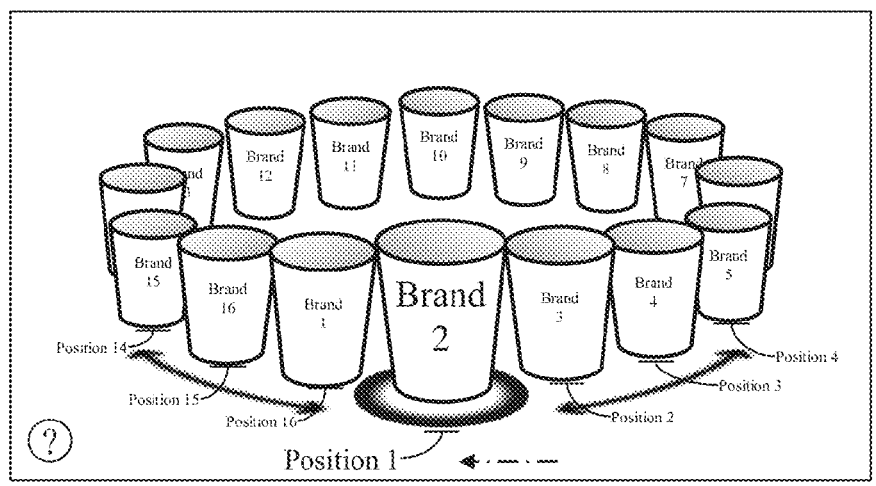
FIG. 11b illustrates a user direct selection of a beverage icon located in position 3.
Figure 11C:
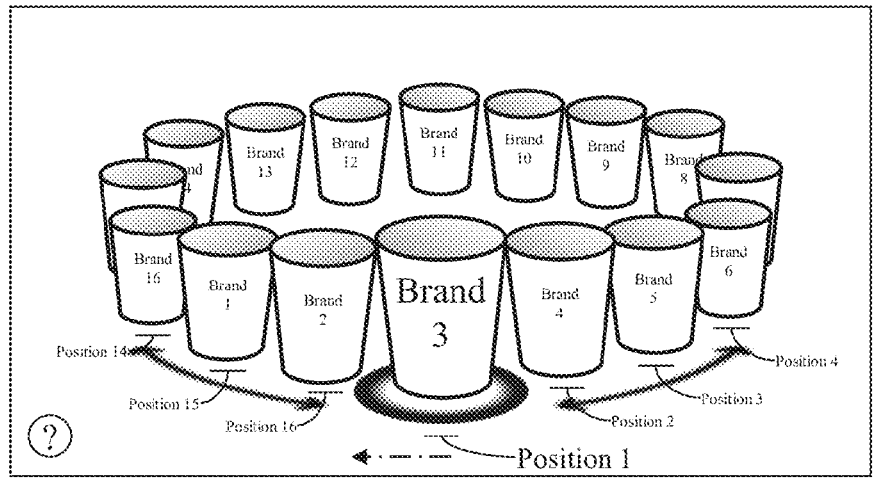
FIG. 11c illustrates a user direct selection of a beverage icon located in position 3.

In addition to the example movement above, the user can move a cup icon directly to the beverage selection position (position 1). FIGS. 11a-11c provide an example of how a user can move a cup icon directly to the beverage selection position (position 1) from the other positions of the beverage selection screen 801. In particular, FIGS. 11a-11c illustrate the direct selection of a beverage of choice represented by cup icon 3 located in position 3. In order to move cup icon 3 located in position 3 directly to the beverage selection position (position 1), the user first touches the cup icon 3 as illustrated in FIG. 11a. As illustrated in FIGS. 11b and 11c, the cup icon 3 will first move from position 3 to position 2 followed by the movement of the cup icon 3 from position 2 to the beverage selection position (position 1). As the cup icon 3 moves from position 3 to position 2 the graphical size of the cup icon 3 increases. Similarly, as the cup icon 3 moves from position 2 to position 1 the graphical size of the cup icon 3 again increases and will reach its largest graphical size and be prominently displayed in front of the user. The interactions between the touch-sensitive display controller 202 and the touch-sensitive display 300 to move a particular beverage selection to the beverage selection position will be described in greater detail herein.

Figure 12A:
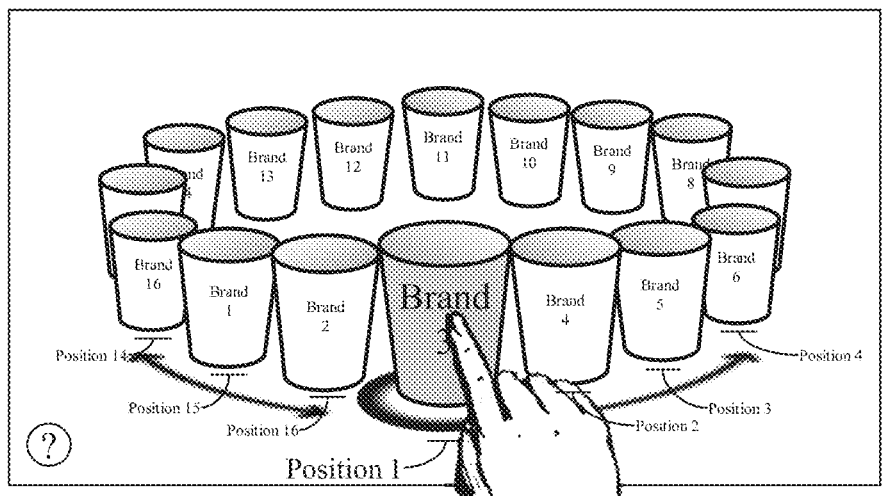
FIG. 12a illustrates a user selecting a beverage icon located at a beverage selection position.
Figure 12B:
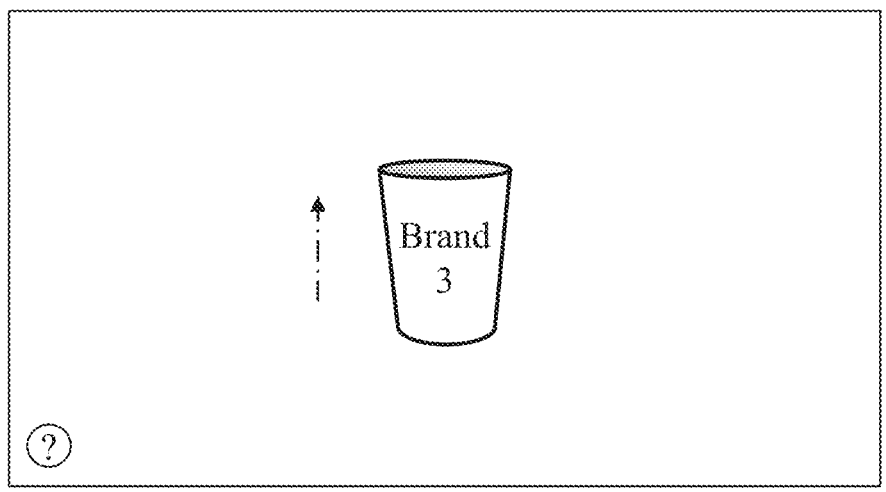
FIG. 12b illustrates a transition between a beverage selection state and a pour state.

FIGS. 12a-12b illustrate screens displayed during a user selection input. As illustrated in FIG. 12a, once the cup icon 3 has been placed into the beverage selection position the user will perform the selection input by performing a tap of the cup icon 3. After the user performs the selection input, the touch sensitive display 300 displays the user's beverage selection for a predetermined time period as illustrated in FIG. 12b. Upon expiration of the predetermined time period (1 second in the preferred embodiment), the beverage dispensing system 50 transitions from the beverage selection state to the pour state as illustrated in FIG. 7. The interaction between the touch-sensitive display controller 202 and the touch-sensitive display 300 to select a particular beverage within the beverage selection state will be described in greater detail herein.

As the beverage dispensing system 50 transitions from the beverage selection state to the pour state, the touch-sensitive display 300 will display the pour screen 802 illustrated in FIG. 7. In the preferred embodiment, the pour screen 802 displays the user's beverage selection prominently in the middle of the touch-sensitive display 300 and presents the user with pour and control options. The pour screen 802 gives the user the options of returning to the beverage selection state, selecting up to two different additives for inclusion in a poured beverage, or pouring the beverage selected from the beverage selection state either alone or with additives. In addition to the foregoing options presented to the user, the pour state displays advertising and suggested additives for mixing with a particular beverage. Advertising scrolls across the top of touch-sensitive display 300 to attract user's attention and suggested additives are displayed next to the user's beverage selection. For example, Coke™ with Vanilla, Coke™ with Cherry, and the like would be displayed on the additive selection screen responsive to a user selection of Coke™.

After entering the pour state and being presented with the pour screen 802, the user may choose to abandon their beverage selection and return to the beverage selection state. To return to beverage selection state 501, the user makes contact with the touch-sensitive display 300 within the area of the GUI marked "Back." The selection of "Back" within the pour screen 802 will return to the beverage dispensing system 50 to the beverage selection state and display beverage selection screen 801 as illustrated in FIG. 6.

The pour state allows the user to select additives for dispensing with their beverage. In the preferred embodiment, the user is presented with four additive choices of which they can select up to two for their beverage. It should be noted that, although there are four additive choices and two additive selections, more or less additive choices and additive selections may be incorporated depending upon application. Within the GUI additives are presented to the user as graphical icons of the additive. For example, the flavor cherry will be represented as a graphical icon of a cherry. The four additive choices have plus signs associated with their graphical icons. To make an additive selection, the user touches graphical icon of their chosen additive.

Figure 13:
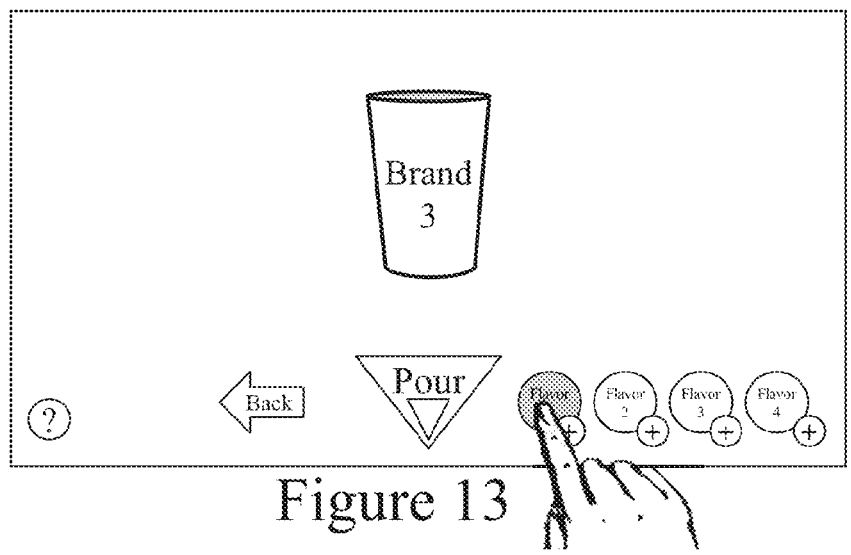
FIG. 13 illustrates a user selecting a first additive within a pour state.
Figure 14:
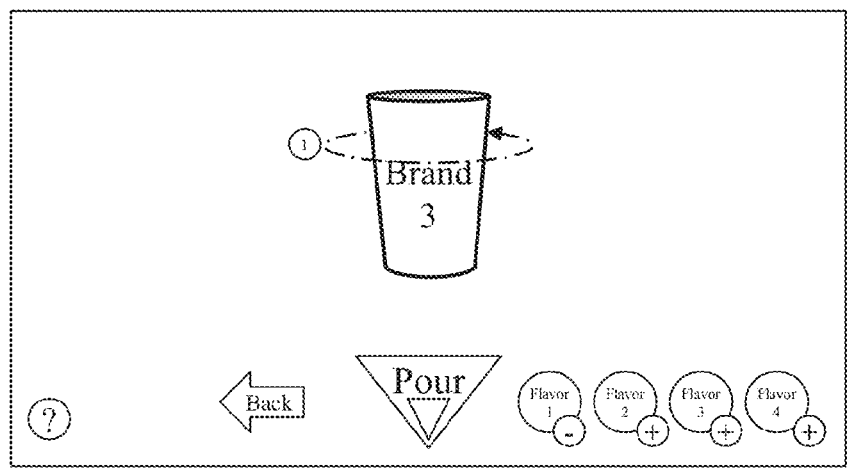
FIG. 14 illustrates a first selected additive within a pour state.
Figure 15:
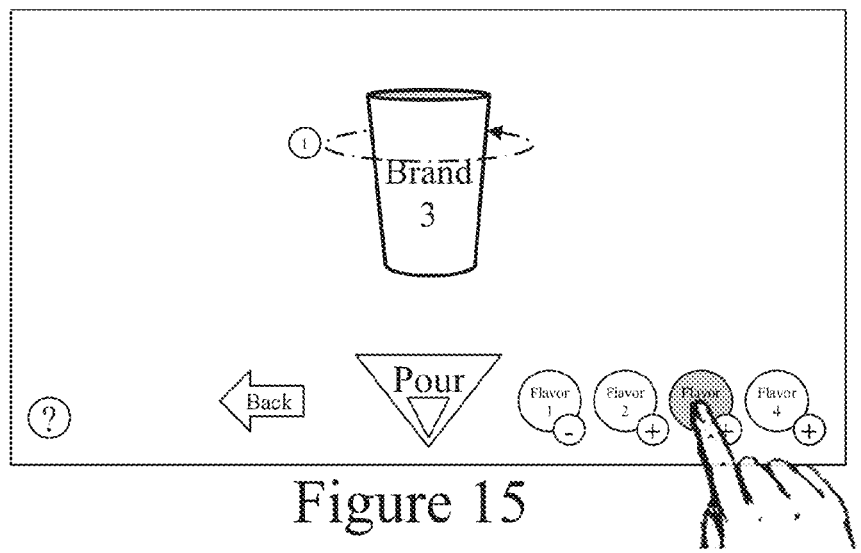
FIG. 15 illustrates a user selecting a second additive within a pour state.

FIGS. 13-16b illustrate examples of the GUI when the user chooses two additives for inclusion in a poured beverage. To make their first additive selection, the user touches the graphical icon of their chosen additive as illustrated in FIG. 13. As illustrated in FIG. 14, the GUI will be modified in two ways, the plus sign associated with the chosen additive becomes a minus sign and an animation of the selected additive rotates around the user's selected beverage. To make their second additive selection, the user touches the graphical icon associated with their chosen additive as illustrated in FIG. 15. As illustrated in FIG. 16a, after the user makes a second additive selection, the GUI will be modified in three ways, an animation of the user's second additive selection accompanies the first additive selection and rotates around the user's selected beverage, the plus sign associated with second additive selected become a minus sign, and the remaining additive plus signs disappear to indicate the disabling of additive selection.

After choosing an additive for inclusion in the selected beverage, the user has the option of erasing any chosen additive selections. To erase a chosen additive selection, the user touches the graphical icon associated with the selected additive. After touching the graphical icon, the GUI will be modified to remove the deselected additive from rotation around the user's selected beverage. In addition, the GUI will be modified to display a pins sign associated with the deselected additive.

Figure 16A:
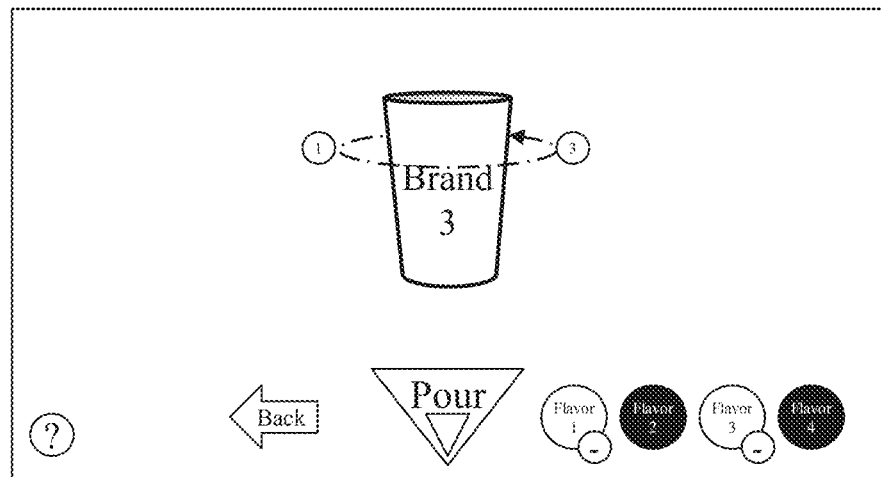
FIG. 16a illustrates a second selected additive within a pour state.
Figure 16B:
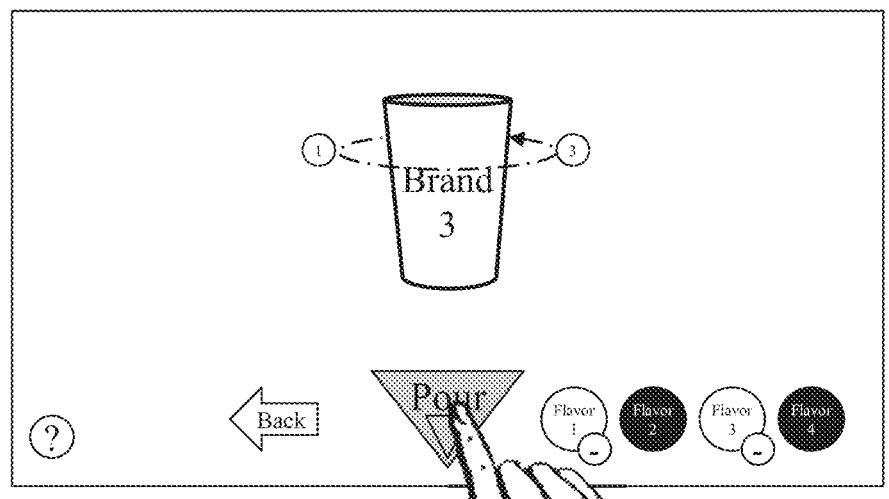
FIG. 16b illustrates pouring a beverage within a pour state.

The pour state gives the user the option of pouring a beverage with or without an additive. After the user has made the decision whether to include additives, the pour state allows the user to pour their selected beverage. To pour a beverage selection as illustrated in FIG. 16b, the user places their cup under the nozzle 116 and makes contact with the touch-sensitive display 300 within the area of the GUI marked "Pour." When the user makes contact with the "Pour" area, the beverage dispenser 100 begins to dispense the selected beverage either alone or with any selected additives. In the preferred embodiment, a continuous user input is required to pour a selected beverage. As such, the user must continue to contact the "Pour" icon until their cup fills to a desired level. However, the beverage dispensing system 50 includes a pour timing program within the memory 213 that prevents beverage overflow. In particular, once the user makes contact with the "Pour" icon, the touch-sensitive display controller 202 starts the pour timing program. Consequently, if contact with the "Pour" icon does not cease prior to the expiration of the pour timing program, the touch-sensitive display controller 202 outputs a cease pour command to the beverage dispenser controller 201, thereby preventing farther pouring and thus overflow of the user's selected beverage. Although in the preferred embodiment a continuous user input is required to pour a selected beverage, those of ordinary skill in the art will appreciate other mechanisms to deliver a desired amount of beverage such as a timer.

After the user retrieves their cup and moves away from the beverage dispensing system 50, a next user may take the previous user's place and pour a beverage. The new user would make contact with the touch-sensitive display 300 within the area of the GUI marked "Back." The selection of "Back" within the pour screen 802 erases the previous user's beverage and additive selections and returns the new user to the beverage selection state. After a new user returns to the beverage selection state they will follow the process as previously described to select a beverage, additives, and to pour their beverage selection. Alternatively, if there is no new user, the beverage dispensing system 50 returns to the advertising state upon the expiration of a global timing program as described herein. The interactions between the touch-sensitive display controller 202, the touch-sensitive display 300, and the beverage dispenser controller 201 to select additives and pour a selected beverage as well as return to the beverage selection state or the advertising state will be described in greater detail herein.

The beverage dispensing system 50 includes a beverage selection help state and a pour help state displayed on the touch-sensitive display 300. The beverage selection help state and the pour help state use graphical animations to guide the user in the operation of the Gill of the beverage dispensing system 50. Specifically, the beverage selection help state and the pour help state use an animated hand that demonstrates operation of the GUI to select beverages, select additives, and to pour a beverage. For example, when in the beverage selection state, the beverage selection help state will show an animated hand moving the cup icons and selecting a beverage. FIGS. 8a-8c illustrate example help screens 803-805 within the beverage selection help state that show the animated hand selecting a beverage within the beverage selection state. When the beverage dispensing system 50 is in the pour state, the pour help state will show an animated hand selecting additives and pouring a selected beverage. FIGS. 9a-9e illustrate the help screens 806-810 within the pour help state that show the animated hand pouring a selected beverage within the pour state.

In one instance, the touch-sensitive display 300 transitions into the beverage selection help state from the advertising state after expiration of a timing program contained within the memory 213. Additionally, the touch-sensitive display 300 transitions into the beverage selection help state or the pour help state from either the beverage selection state or the pour state when a user remains at the beverage dispensing system 50 without making an input for 8 seconds. Alternatively, the touch sensitive display 300 may include a "?" icon in both the beverage selection state and the pour state that when touched results in the touch-sensitive display 300 transitioning into the beverage selection help state or the pour help state. The touch-sensitive display 300 remains in either the beverage selection help state or the pour help state until the user initiates an input or until the expiration of a help state timing program within the memory 213. When a user input is detected or the timer within the help state timing program expires, the touch-sensitive display 300 exits the beverage selection help state or the pour help state and returns to the advertising state, the beverage selection state, or the pour state. The interaction between the touch-sensitive display 300 and the touch-sensitive display controller 202 when the beverage dispensing system 50 transitions from either the beverage selection state or the pour state into either the beverage selection help state or the pour help state will be described in greater detail herein.

The touch-sensitive display 300 returns to the advertising state from the beverage selection state and the pour state upon expiration of a global timing program within the memory 213. Once the global timing program within the memory 213 expires, the beverage dispensing system 50 will return to the advertising state and display screens such as the advertising screen 800 depicted in FIG. 5. The interaction between the global timing program, the touch-sensitive display controller 202, and the touch-sensitive display 300 when the beverage dispensing system 50 transitions from the beverage selection state and the pour state into the advertising state will be described in greater detail herein.

Figure 18A:
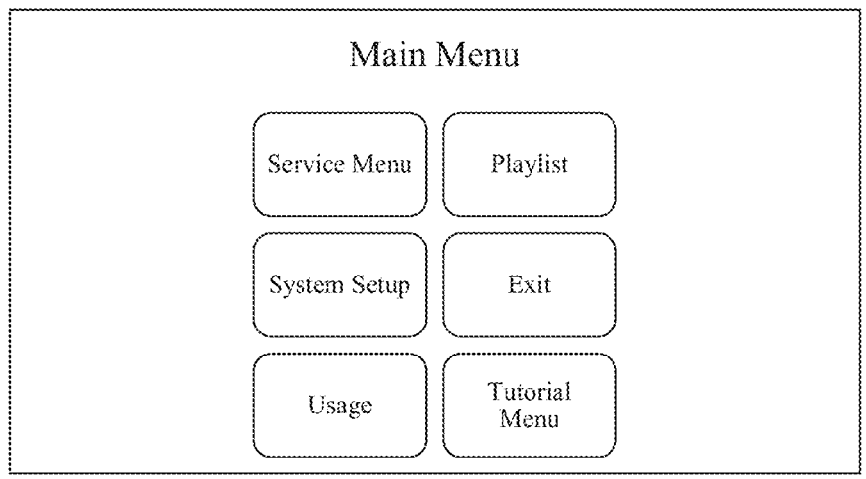
FIG. 18a illustrates a main menu screen within a maintenance state.
Figure 18B:
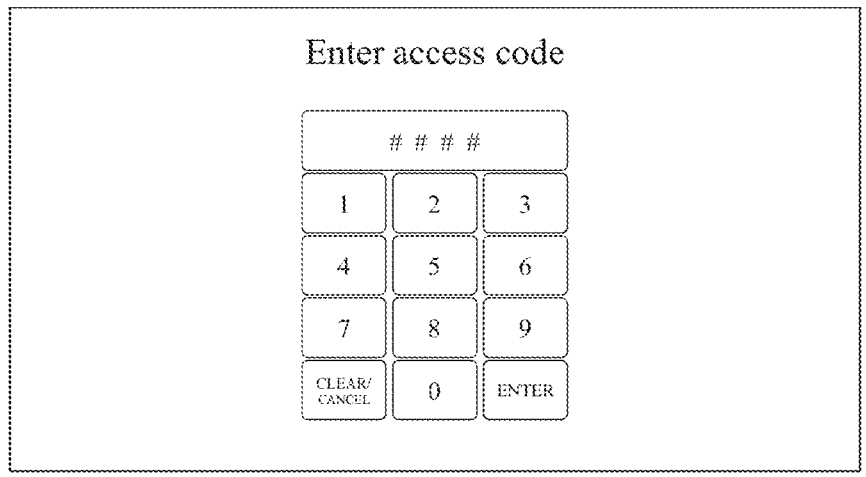
FIG. 18b illustrates a pass code key screen within the maintenance state.
Figure 18C:
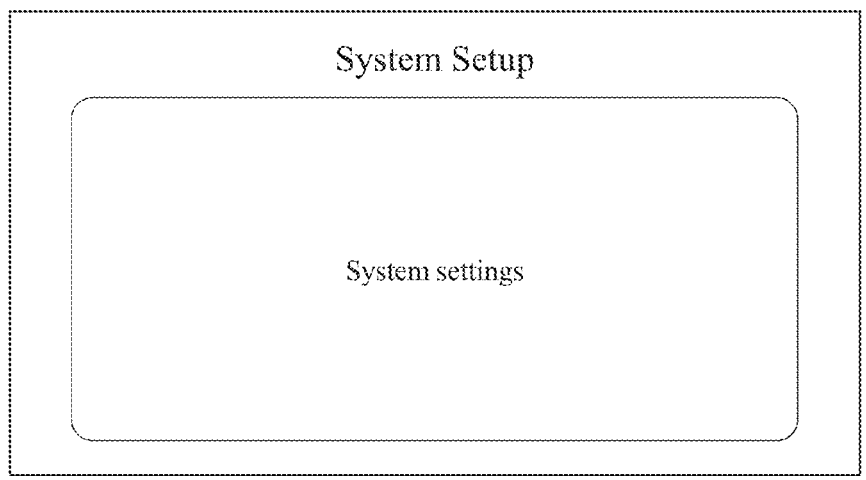
FIG. 18c illustrates a system setup screen within the maintenance state.
Figure 18D:
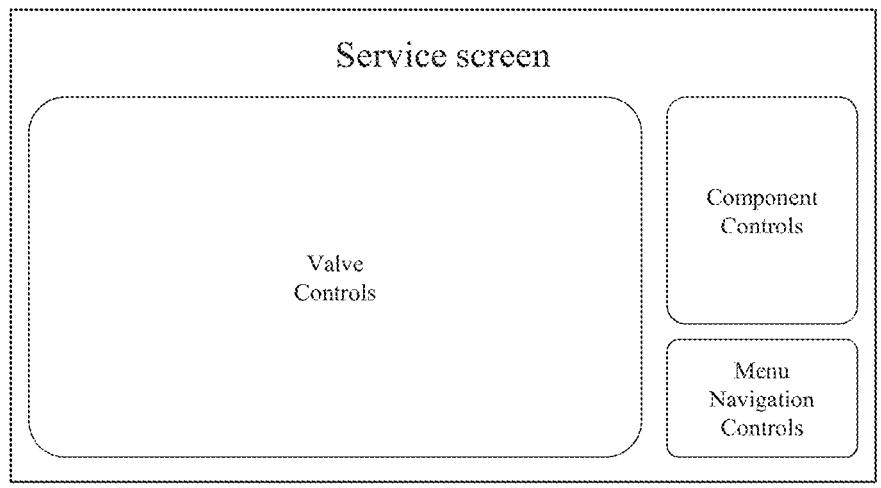
FIG. 18d illustrates a service screen within the maintenance state.
Figure 18E:
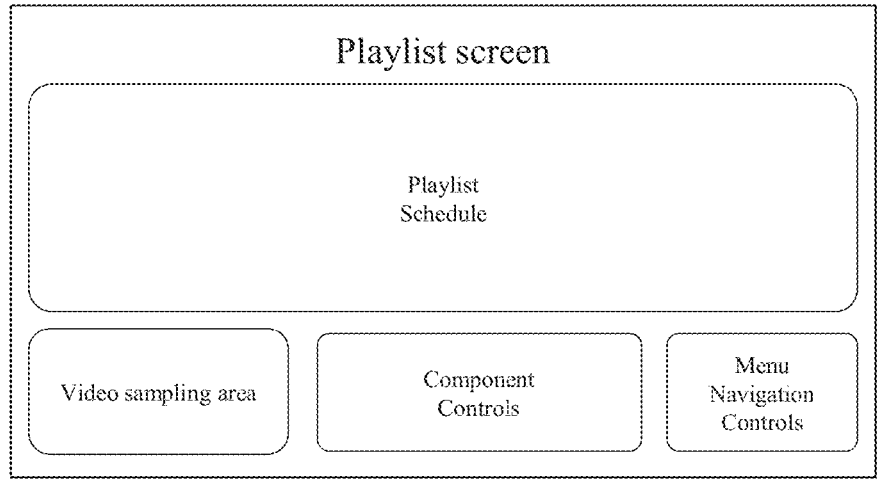
FIG. 18e illustrates a playlist screen within the maintenance state.
Figure 18F:
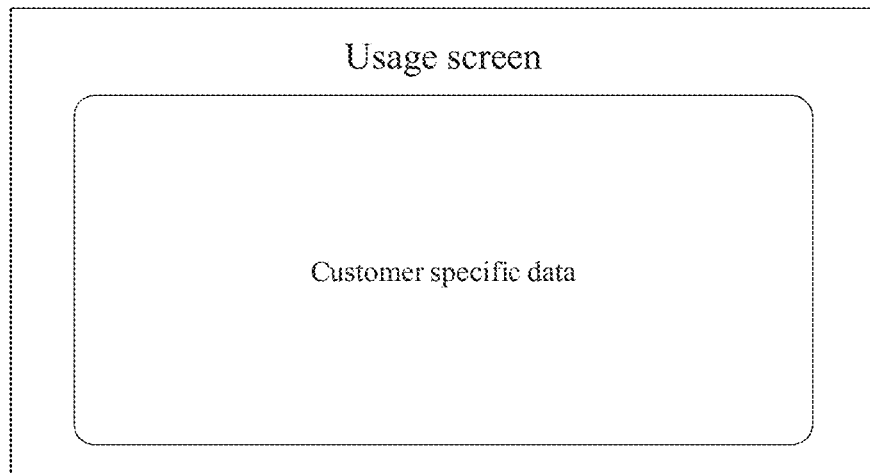
FIG. 18f illustrates a usage screen within the maintenance state.

The beverage dispensing system 50 includes a maintenance state that allows a technician to check and change settings within the beverage dispensing system 50. In the present embodiment of the invention, the maintenance state is accessed in either the beverage selection state or the pour state by a technician touching the touch-sensitive display 300 at a predetermined location and entering a pass code. In the preferred embodiment, the technician touches a corner of the touch-sensitive display 300 to access the maintenance state. FIG. 18b illustrates an access code screen that is presented to the technician after the technician selects a corner of the touch-sensitive display 300. FIG. 18a illustrates an example main menu screen of the maintenance state presented to the technician after correct access code entry. The main menu screen of the maintenance state according to the preferred embodiment includes a service menu icon, a playlist icon, a system setup icon, a user interface icon, a usage icon, a tutorial icon, and an exit icon.

The selections presented to the technician via the main menu screen provide the technician with the maintenance options available for the beverage dispensing system 50 and instructional videos demonstrating how to perform the maintenance operations available to the technician. Illustratively, selection of the service menu icon displays the service screen shown in FIG. 18d thereby allowing a technician to configure the beverage dispensing system 50. By way of example, the technician can assign a particular valve to a particular brand as well as configure the display 300 such that a cup icon represents the brand. Selection of the playlist icon displays the playlist screen shown in FIG. 18e thereby allowing a technician to control the video and audio presented to a user during the advertising state. Selection of the system setup up icon displays the system set up screen illustrated in FIG. 18c and allows a technician to initialize the beverage dispensing system 50. An example of initialization in the preferred embodiment includes establishment of the number of dispensing valves and thus the number of brands available for dispensing from the beverage dispensing system 50 as well as the initiation of communication between the control system 200 and the remaining components of the beverage dispensing system 50. Selection of the usage icon displays the usage screen shown in FIG. 18f. The usage screen provides the technician with the dispensing data from the beverage dispensing system 50 such as the amounts of beverage and additive syrups dispensed. Selection of the tutorial icon displays a list of tutorial videos available to the technician that demonstrate how to perform certain maintenance tasks on the beverage dispensing system 50, such as, for example, how to assign a particular valve to a particular brand as well as configure the display 300 to display a cup icon representing the brand. Selection of the exit icon returns the beverage dispensing system 50 to a previous state, either the beverage selection state or the pour state in the preferred embodiment. The interaction between the touch-sensitive display 300 and the touch-sensitive display controller 202 when the beverage dispensing system 50 enters the maintenance state will be described in greater detail herein.

In addition to the touch-sensitive display 300, the user can operate the beverage dispensing system 50 using the alternate interface buttons 121 illustrated in FIG. 2. The alternate interface buttons 121 include three operation buttons; a right arrow button, a left arrow button, and an action button. As described above, the default state of the GUI is the advertising state. The touch-sensitive display controller 202 transitions the touch-sensitive display 300 from the advertising state to the beverage selection state through either the detection of a user by the proximity sensor 400 or by a user touching one of the alternate interface buttons 121. The alternate interface buttons 121 work in concert with the touch-sensitive display 300 to select beverages, additives, and to pour a selected beverage. The right arrow button and the left arrow button allow the user to highlight different options or manipulate icons within a given state. As the user presses either the right arrow button or the left arrow button, icons within a given state will be highlighted or moved. For example, when the user is in the beverage selection state, the right arrow button will rotate the cup icons to the right, while the left arrow button will rotate the cup icons to the left. To select a beverage, the user would rotate a cup into beverage selection position (position 1) and press the action button, thereby selecting a beverage flavor and transitioning the touch sensitive display 300 to the pour state. When the user is in the pour state, the pressing of the right arrow button will highlight an icon to the right of the currently highlighted icon within the pour screen 802. The pressing of the left arrow will highlight an icon to the left of the currently highlighted icon within the pour screen 802. When the user is in the pour state, the action button will allow the user to select highlighted additives and to pour their selected beverage.

Having previously described the presentation and use of the graphical user interface, the operation of the control system 200 to generate the graphical user interface and pour a beverage will now be described with reference to FIGS. 19-23. In FIGS. 19-23, diamond blocks represent decision functions and rectangular blocks represent processing and control functions.

Figure 19:
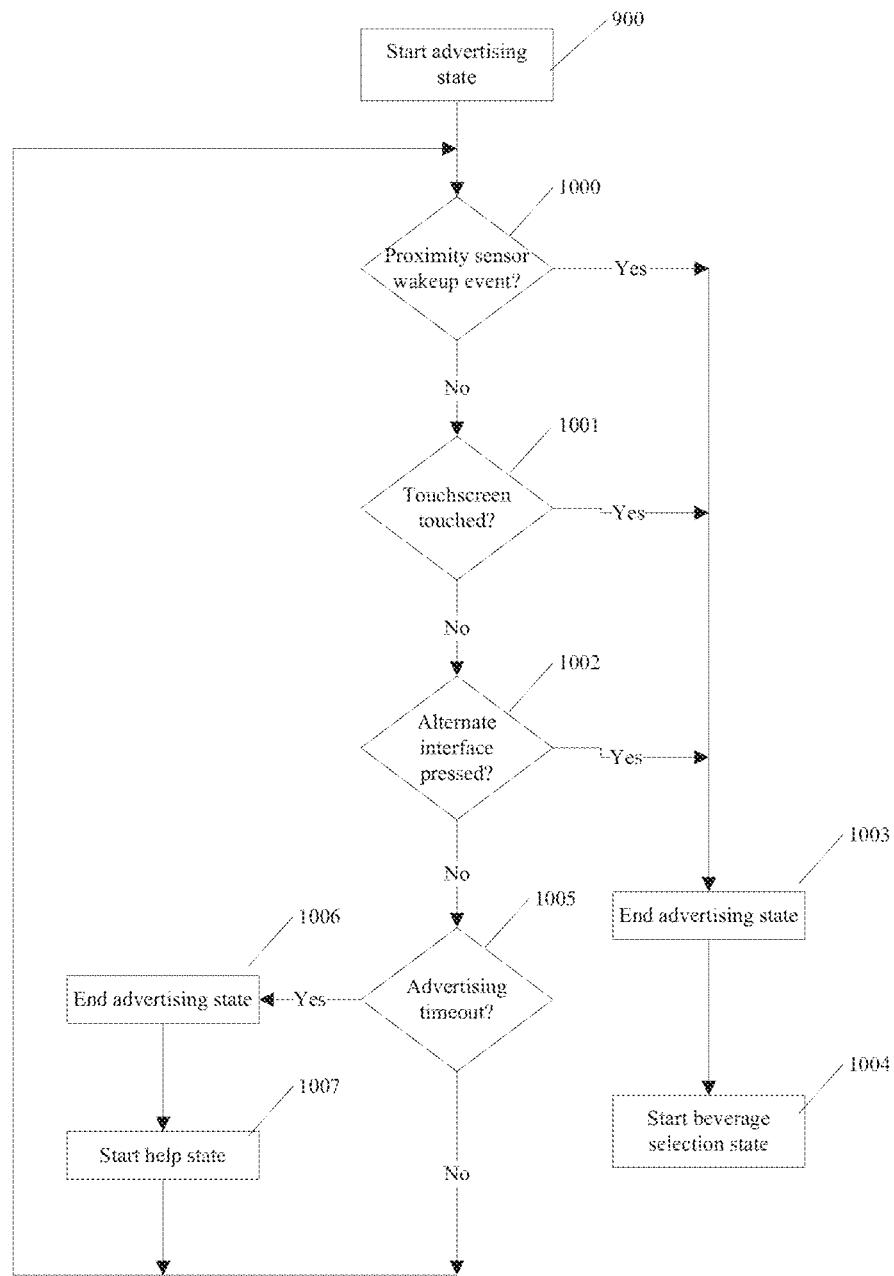
FIG. 19 is a flow chart illustrating the operation of an advertising state for the beverage dispensing system.

The touch-sensitive display controller 202 begins in the advertising state and must continuously monitor the proximity sensor 400, the touch-sensitive display 300, and the alternate interface buttons 121 during operation of the beverage dispensing system 50 to determine whether a user is present at the beverage dispensing system 50. FIG. 19 is a flow chart illustrating the interaction between the touch-sensitive display controller 202, the proximity sensor 400, the touch-sensitive display 300, and the alternate interface buttons 121. The touch-sensitive display controller 202 begins in step 900 where the touch-sensitive display controller 202 outputs a command to the touch-sensitive display 300 instructing the touch-sensitive display 300 to display advertising screens such as those depicted in FIG. 5. In addition, the touch-sensitive display controller 202 outputs a command activating the sound system 600. The touch-sensitive display controller 202 proceeds to step 1000 and determines if the proximity sensor 400 has output a signal indicating a user is present. If the proximity sensor 400 has output a signal, the touch-sensitive display controller 202 proceeds to step 1003, otherwise, no user is present and the touch-sensitive display controller 202 proceeds to step 1001. In step 1001, the touch-sensitive display controller 202 determines whether a user has touched the touch-sensitive display 300. If a user has touched the touch-sensitive display 300, the touch-sensitive display controller 202 proceeds to step 1003, otherwise, the touch-sensitive display controller 202 proceeds to step 1002. In step 1002, the touch-sensitive display controller 202 determines if a user has pressed one of the alternate interface buttons 121. If a user has pressed one of the alternate interface buttons 121, the touch-sensitive display controller 202 proceeds to step 1003, otherwise, the touch-sensitive display controller 202 proceeds to step 1005.

As previously described, the touch-sensitive display controller 202 proceeds to step 1003 responsive to one of a user's presence activating the proximity sensor 400, a user touching the touch screen 300, or a user pressing one of the alternate interface buttons 121. Once in step 1003, the touch-sensitive display controller 202 ends the advertising state on the touch-sensitive display 300 by ceasing to display screens on the touch-sensitive display 300 such as those depicted in FIG. 5. Furthermore, the touch-sensitive controller 202 mutes the sound system 600. After ending the advertising state in step 1003, the touch-sensitive controller 202 proceeds to step 1004 and begins the beverage selection state, which will be described herein with reference to FIG. 22.

When the touch-sensitive display controller 202 progresses from step 1002 to step 1005, the touch-sensitive display controller 202 in step 1005 determines if a predetermined time period (5 minutes in the preferred embodiment) has expired within the advertising state. If the predetermined time period has expired, the touch-sensitive display controller 202 proceeds to step 1006, otherwise the touch-sensitive display controller 202 returns to step 1000 for continued monitoring of the proximity sensor 400, the touch-sensitive display 300, and the alternate interface buttons 121 for user input. When the touch-sensitive display controller 202 progresses from step 1005 to step 1006, the touch-sensitive display controller 202 in step 1006 ends the advertising state on the touch-sensitive display 300 as previously described. After ending the advertising state, the touch-sensitive display controller 202 proceeds to step 1007 and enters the help state for the beverage dispensing system 50, which will be described herein with reference to FIG. 22. The touch-sensitive display controller 202 then returns to step 1000 for continued monitoring of the proximity sensor 400, the touch-sensitive display 300, and the alternate interface buttons 121 for user input.

Figure 20:
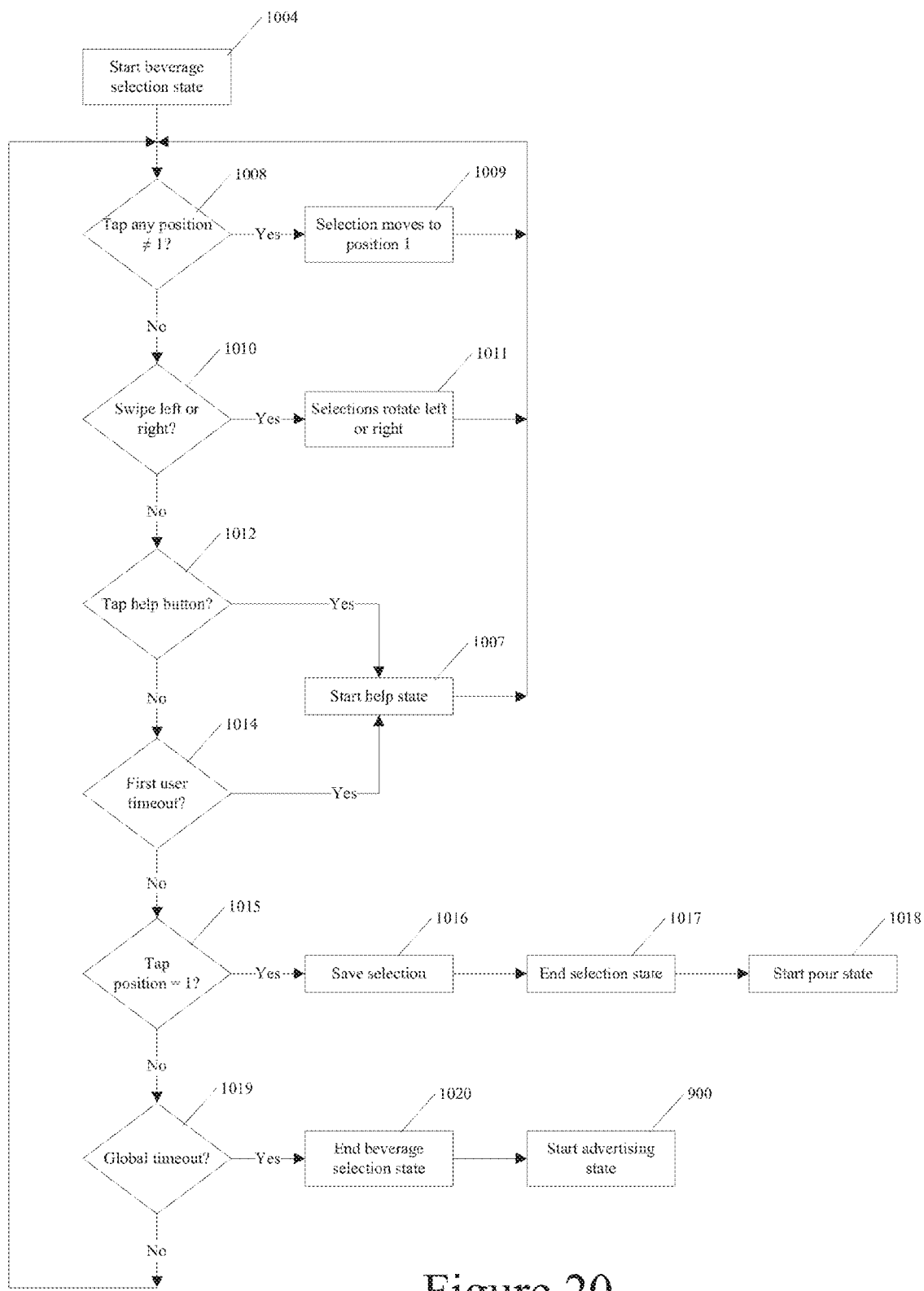
FIG. 20 is a flow chart illustrating the operation of a beverage selection state for the beverage dispensing system.

FIG. 20 is a flow chart illustrating the interaction between the touch-sensitive display controller 202 and the touch-sensitive display 300 when the beverage dispensing system 50 is in the beverage selection state. The touch-sensitive display controller 202 begins the beverage selection state in step 1004 by instructing the touch-sensitive display 300 to display the beverage selection screen 801 depicted in FIG. 6. Furthermore, the touch-sensitive display controller 202 resets a beverage selection help state timing program and a beverage selection state global timing program. When the beverage dispensing system 50 is in the beverage selection state, the touch-sensitive display controller 202 monitors the touch-sensitive display 300 for output in the form of a signal or signals generated as a result of a user touching the touch-sensitive display 300. In addition, the touch-sensitive display controller 202 employs timing programs within the memory 213 to limit the time available for non-output from the touch-sensitive display 300. The timing programs monitor time for a first user timeout and also for a global timeout.

In the preferred embodiment, the output from the touch-sensitive display 300 in the beverage selection state will be either a user screen request to move the position of a desired beverage represented as a cup icon, a user screen selection of a desired beverage for pouring, or a user selecting a help icon. A request for cup icon movement entails a user moving a finger or fingers along the touch sensitive display 300, and processing of the request involves the touch-sensitive display controller 202 calculating the start point and the ending point of the movement. Alternatively, a request for cup icon movement entails a user tapping the touch sensitive display 300 at a cup icon, and processing of the request involves the touch-sensitive display controller 202 calculating the movement of the cup icon from its current position to the beverage selection position (position 1). A beverage selection request entails a user touching the touch sensitive display 300 at the beverage selection position (position 1), and processing of the request involves the touch-sensitive display controller 202 determining the user's beverage selection. A selection of a help icon by the user entails the user touching a "?" icon on the touch-sensitive display 300.

After beginning the beverage selection state the touch-sensitive controller 202 proceeds to step 1008. In step 1008, the touch-sensitive display controller 202 monitors the touch-sensitive display 300 for a user tapping a cup icon. If a user has not tapped a cup icon, the touch-sensitive display controller 202 proceeds to step 1010, otherwise, a user has tapped a cup icon and the touch-sensitive display 202 proceeds to step 1009. In step 1009, the touch-sensitive display controller 202 sends a command to the touch-sensitive display 300 to execute a movement of a cup icon from its current position to the beverage selection position (position 1) as previously described with reference to FIGS. 11a-11c. After sending a command to the touch-sensitive display 300 to move the cup icon to the selection position (position 1), the touch-sensitive display controller 202 returns to step 1008 for continued monitoring of the touch-sensitive display 300 for user input.

In step 1010, the touch-sensitive display controller 202 monitors the touch-sensitive display 300 for movement of a cup icon by a user. The user moves the cup icon by selecting a cup icon and swiping their finger to the right or left. If a user has not moved a cup icon, the touch-sensitive display controller 202 proceeds to step 1012, otherwise, a user has moved a cup icon and the touch-sensitive display 202 proceeds to step 1011. In step 1011, the touch-sensitive display controller 202 calculates the start point and ending point of a user's movement. After calculating the movement, the touch-sensitive display controller 202 sends a command to the touch-sensitive display 300 to execute a movement of a cup icon from its current position to the position selected by a user as previously described with reference to FIGS. 10a-10c. After sending a command to the touch-sensitive display 300 to move the cup icon to a user selected position, the touch-sensitive display controller 202 returns to step 1008 for continued monitoring of the touch-sensitive display 300 for user input.

The beverage dispensing system 50 provides a user with a beverage selection help state accessible from the beverage selection state. The beverage selection help state is accessible through either a user touching the help icon "?" or a one time expiration of a fixed time amount for a beverage selection help state timing program within the memory 213. The touch-sensitive display controller 202 monitors the touch-sensitive display 300 for user input, and, if the help icon "?" is touched or no user input is detected within the fixed time amount, the touch-sensitive display controller 202 places the beverage dispensing system 50 into the beverage selection help state. In the preferred embodiment, the fixed time amount set by the beverage selection help state timing program is 8 seconds. Consequently, the touch-sensitive display controller 202 in step 1012 monitors the touch-sensitive display 300 for a touching of the help icon "?". If a user has touched the help icon "?", the touch-sensitive display controller 202 proceeds to step 1007, otherwise, a user has not touched a help icon "?" and the touch-sensitive display 202 proceeds to step 1014. In step 1014, the touch-sensitive display controller 202 monitors the timing program within the memory 213 to determine if the fixed time amount (8 seconds) has expired without a user input on the touch-sensitive display 300. If the timing program within the touch-sensitive display controller 202 has expired, a first user timeout has occurred, and the touch-sensitive display controller 202 proceeds to step 1007, otherwise, the touch-sensitive display controller 202 will proceed to step 1015. In step 1007, the touch-sensitive display controller 202 exits the beverage selection state and enters the help state for the beverage dispensing system 50, which will be described herein with reference to FIG. 22. After completing and then returning from the beverage selection help state, the touch-sensitive display controller 202 will return to step 1008 for continued monitoring of the touch-sensitive display 300. At this point, the one time expiration of the beverage selection help state timing program has occurred, and the touch-sensitive display controller 202 will not enter step 1007 from step 1014 until a new beginning of the beverage selection state at step 1004.

In step 1015, the touch-sensitive display controller 202 monitors the touch-sensitive display 300 to determine if a user has executed the beverage selection request as previously described with reference to FIGS. 12a-12b. If the user has not executed the beverage selection request, the touch-sensitive display controller 202 proceeds to step 1019, otherwise, the user makes a beverage selection request, and the touch-sensitive display controller 202 proceeds to step 1016. In step 1016, the touch-sensitive display controller 202 saves the user's beverage selection for use in the pour state prior to entering step 1017. The touch-sensitive controller 202 in step 1017 ends the beverage selection state by sending commands to touch-sensitive display 300 to display the screen depicted in FIG. 12b. After ending the beverage selection state in step 1017, the touch-sensitive controller 202 proceeds to step 1018 and begins the pour state, which will be described herein with reference to FIG. 21.

In step 1019, the touch-sensitive display 202 determines if a global timeout within the touch-sensitive display controller 202 has occurred. A global timeout occurs upon the expiration of a fixed time amount for a beverage selection state global timing program within the memory 213. In the preferred embodiment, the fixed time amount set by the beverage selection state global timing program is 14 seconds. Typically, the fixed time amount for the beverage selection state global timing program (14 seconds) is greater than the fixed time amount for the beverage selection help state timing program (8 seconds) such that the beverage dispensing system 50 executes the beverage selection help state prior to a global timeout. The touch-sensitive display controller 202 monitors the beverage selection state global timing program within the memory 213 to determine if the global timeout has expired. If no global timeout has occurred, the touch-sensitive display controller 202 returns to step 1008 for continued monitoring of the touch-sensitive display 300. However, if a global timeout has occurred, the touch-sensitive display controller 202 proceeds to step 1020 and records the end of the beverage selection state prior to entering step 900 wherein the touch-sensitive display controller 202 begins the advertising state as described herein with reference to FIG. 19.

Figure 21:
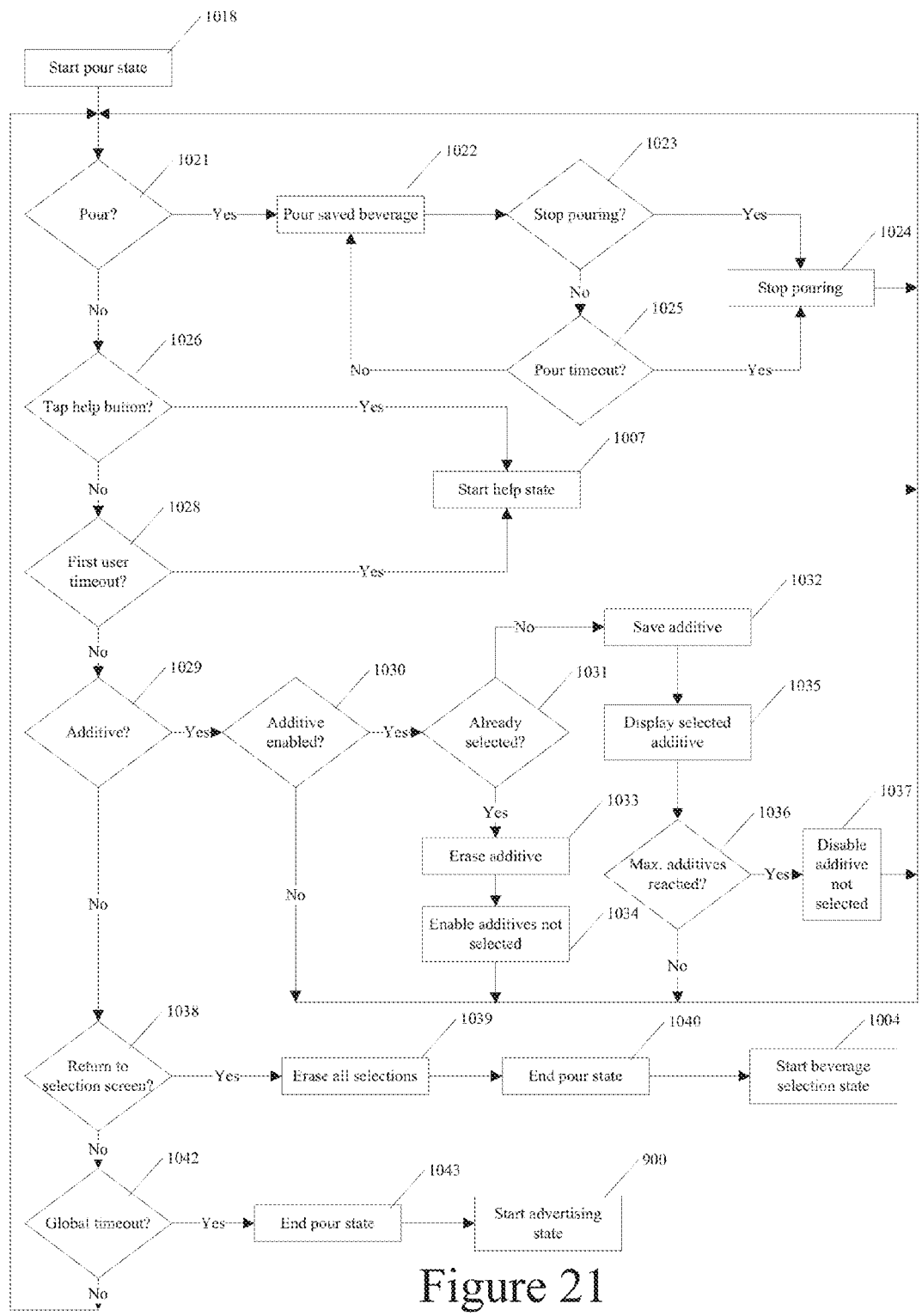
FIG. 21 is a flow chart illustrating the operation of a pour state for the beverage dispensing system.

FIG. 21 is a flow chart illustrating the interaction between the touch-sensitive display controller 202 and the touch-sensitive display 300 when the beverage dispensing system 50 is in the pour state. The touch-sensitive display controller 202 begins in step 1018 where the touch-sensitive controller 202 outputs a command to the touch-sensitive display 300 instructing the touch-sensitive display 300 to display the pour screen 803 depicted in FIG. 7. Furthermore, the touch-sensitive display controller 202 resets a pour help state timing program and a pour state global timing program. When the beverage dispensing system 50 is in the pour state, the touch-sensitive display controller 202 monitors the touch-sensitive display 300 for output in the form of a signal or signals generated as a result of a user touching the touch-sensitive display 300. In addition, the touch-sensitive display controller 202 employs timing programs within the memory 213 to limit the time available for non-output from the touch-sensitive display 300. The timing programs monitor time for a first user timeout and also for a global timeout.

In the preferred embodiment, the output from the touch-sensitive display 300 in the pour state will be one of a user screen request for the pouring of a selected beverage including any selected additives, a user screen request to cease the pouring of a selected beverage including any selected additives, a user selecting a help icon, a user screen selection of an additive, a user screen request for removal of an additive, or a user screen request to exit the pour state.

After beginning the pour state, the touch-sensitive controller 202 proceeds to step 1021 and monitors the touch-sensitive display 300 to determine if a user has made a pour request. A user makes a pour request by touching the "Pour" icon on the touch-sensitive display 300 as illustrated in FIG. 12a. If a user has not made a pour request, the touch-sensitive display controller 202 proceeds to step 1026, otherwise, a user has made a pour request, and the touch-sensitive display controller 202 begins a pour timing program within the memory 213 prior entering step 1022. In the preferred embodiment, the pour timing program is a predetermined pour timeout period (7 seconds) designed to prevent overflow. In step 1022, the touch-sensitive display controller 202 outputs a pour command to the beverage dispenser controller 201. The pour command includes the user's beverage selection and any additive selections. Responsive thereto, the beverage dispenser controller 201 activates the valve associated with the user's beverage selection and any valve or valves associated with the user's additive selections and begins pouring the user's beverage. After outputting a pour command, the touch-sensitive display controller 202 proceeds to step 1023 and monitors the touch-sensitive display 300 to determine whether the user has removed contact from the "Pour" icon. If the user removes contact from the "Pour" icon, the touch-sensitive display controller 202 proceeds to step 1024, otherwise, the touch-sensitive display controller 202 proceeds to step 1025. In step 1025, the touch-sensitive display controller 202 monitors the pour timing program within the memory 213 to determine if pour timeout has expired. If no pour timeout has occurred, the touch-sensitive display controller 202 returns to step 1022 for continued pouring and then to step 1023 for continued monitoring of the touch-sensitive display 300. However, if a pour timeout has occurred, the touch-sensitive display controller 202 proceeds to step 1024. In step 1024, which may be entered from both steps 1023 and 1025, the touch-sensitive display controller 202 outputs a cease pour command to the beverage dispenser controller 201. Responsive thereto, the beverage dispenser controller 201 deactivates the valve associated with the user's beverage selection and any valve or valves associated with the user's additive selections. The touch-sensitive display controller 202 resets the pour timing program within the memory 213 and returns to step 1021 for continued monitoring of the touch-sensitive display 300.

The beverage dispensing system 50 provides a user with a pour help state accessible from the pour state. The pour help state is accessible through either a user touching the help icon "?" or a one time expiration of a fixed time amount for a pour help state timing program within the memory 213. The touch-sensitive display controller 202 monitors the touch-sensitive display 300 for user input, and, if the help icon "?" is touched or no user input is detected within the fixed time amount, the touch-sensitive display controller 202 places the beverage dispensing system 50 into the pour help state. In the preferred embodiment, the fixed time amount set by the pour help state timing program is 8 seconds. Consequently, the touch-sensitive display controller 202 in step 1026 monitors the touch-sensitive display 300 for a touching of the help icon "?". If a user has touched the help icon "?", the touch-sensitive display controller 202 proceeds to step 1007, otherwise, a user has not touched a help icon "?" and the touch-sensitive display 202 proceeds to step 1028. In step 1028, the touch-sensitive display controller 202 monitors the timing program within the memory 213 to determine if the fixed time amount (8 seconds) has expired without a user input on the touch-sensitive display 300. If the timing program within the touch-sensitive display controller 202 has expired, a first user timeout has occurred, and the touch-sensitive display controller 202 proceeds to step 1007, otherwise, the touch-sensitive display controller 202 will proceed to step 1029. In step 1007, the touch-sensitive display controller 202 exits the pour state and enters the help state for the beverage dispensing system 50, which will be described herein with reference to FIG. 22. After completing and then returning from the pour help state, the touch-sensitive display controller 202 will return to step 1021 for continued monitoring of the touch-sensitive display 300. At this point, the one time expiration of the pour help state timing program has occurred, and the touch-sensitive display controller 202 will not enter step 1007 from step 1028 until a new beginning of the pour state at step 1018.

While executing the pour state, the beverage dispensing system 50 in the preferred embodiment provides a user with the option of including up to two additives with their selected beverage. In step 1029, the touch-sensitive display controller 202 monitors the touch-sensitive display 300 to determine if a user has made an additive selection request. If a user has not made an additive selection request, the touch-sensitive display controller 202 proceeds to step 1038, otherwise, a user has made an additive selection request, and the touch-sensitive display controller 202 proceeds to step 1030. In step 1030, the touch-sensitive display controller 202 determines if the user's additive selection is enabled. As previously described, once two additives have been selected, the touch-sensitive display controller 202 disables unselected additives and removes additive plus signs from the unselected additives. Consequently, the touch-sensitive display controller 202 in step 1030 determines whether the user is touching an unselected additive disabled as a result of two prior additive selections. The touching of an unselected additive disabled as a result of two prior additive selections results in the touch-sensitive display controller 202 returning to step 1021 for continued monitoring of the touch-sensitive display 300. Conversely, the touch-sensitive display controller 202 proceeds to step 1031 when the user has selected an enabled additive.

In step 1031, the touch-sensitive display controller 202 decides whether the user's additive selection request is existing requiring erasing or new requiring saving. In particular, the touch-sensitive display controller 202 compares the user's additive selection with any stored additive selections to determine if the request was existing or new. When the user selects a previously selected additive, the touch-sensitive display controller 202 proceeds to step 1033 and erases the user's additive selection from the memory 213. In step 1034, the touch-sensitive display controller 202 enables the unselected additive as well as any other unselected additives and returns additive plus signs to the unselected additives. After executing step 1034, the touch-sensitive display controller 202 returns to step 1021 for continued monitoring of the touch-sensitive display 300.

When the user selects a new additive, the touch-sensitive display controller 202 proceeds to step 1032 and saves the user's additive selection in the memory 213 for use during the pouring of the selected beverage. The touch-sensitive display controller 202 then executes step 1035 by controlling the touch sensitive display 300 such that the touch sensitive display 300 displays the requested additive selection as previously described with reference to FIG. 14. In step 1036, the touch-sensitive display controller 202 decides whether the user additive selection request is a second request. In the preferred embodiment, a user is only allowed a maximum of two additive selections. If the user additive selection request is not a second request, the touch-sensitive display controller 202 returns to step 1021 for continued monitoring of the touch-sensitive display 300 for an output, which includes a user request for a second additive. A determination in step 1036 that a second additive request has been made results in the touch-sensitive display controller 202 proceeding to step 1037 and disabling the unselected additives. In addition, the touch-sensitive display controller 202 controls the touch sensitive display 300 such that the touch sensitive display 300 removes the additive selection options as previously described with reference to FIG. 16a.

The touch-sensitive display controller 202 then returns to step 1021 for continued monitoring of the touch-sensitive display 300 for an output, which no longer includes user additive request options.

The pour state provides a user with the option of exiting the pour state and returning to the beverage selection state by making a pour state exit request. In step 1038, the touch-sensitive display controller 202 monitors the touch-sensitive display 300 to determine if a user has made a pour state exit request. A pour state exit request entails a user touching the touch sensitive display 300 at the "Back" icon. If the user has not made a pour state exit request the touch-sensitive display controller 202 proceeds to step 1042 otherwise the user has made a pour state exit request. A pour state exit request results in the touch-sensitive display controller 202 proceeding to step 1039 and erasing from the memory 213 the user's beverage selection made during the beverage selection state as well as any additive selections. The touch-sensitive display controller 202 then proceeds to step 1040 and ends the pour state. After ending the pour state in step 1040, the touch-sensitive controller 202 proceeds to step 1004 and begins the beverage selection state, as previously described with reference to FIG. 20.

In step 1042, the touch-sensitive display 202 determines if a global timeout within the touch-sensitive display controller 202 has occurred. A global timeout occurs upon the expiration of a fixed time amount for a beverage selection state global timing program within the memory 213. In the preferred embodiment, the fixed time amount set by the pour state global timing program is 14 seconds. Typically, the fixed time amount for the pour state global timing program is greater than the fixed time amount for the pour help state timing program such that the beverage dispensing system 50 executes the pour help state prior to a global timeout. The touch-sensitive display controller 202 monitors the pour state global timing program within the memory 213 to determine if the global timeout has expired. If no global timeout has occurred, the touch-sensitive display controller 202 returns to step 1021 for continued monitoring of the touch-sensitive display 300. However, if a global timeout has occurred, the touch-sensitive display controller 202 proceeds to step 1043 and records the end of the pour state prior to entering step 900 wherein the touch-sensitive display controller 202 begins the advertising state as previously described with reference to FIG. 19.

The beverage dispensing system 50 provides a user with a beverage selection help state accessible from the advertising state and the beverage selection state and a pour help state accessible from the pour state. The beverage selection help state is accessed from the beverage selection state through either a help icon "?" or a timing program that provides the user with a fixed amount of selection time. Similarly, the pour help state is accessed from the pour state through either a help icon "?" or a timing program that provides the user with a fixed amount of selection time. In the preferred embodiment, the fixed amount of time set by the timing program is 8 seconds.

Figure 22:
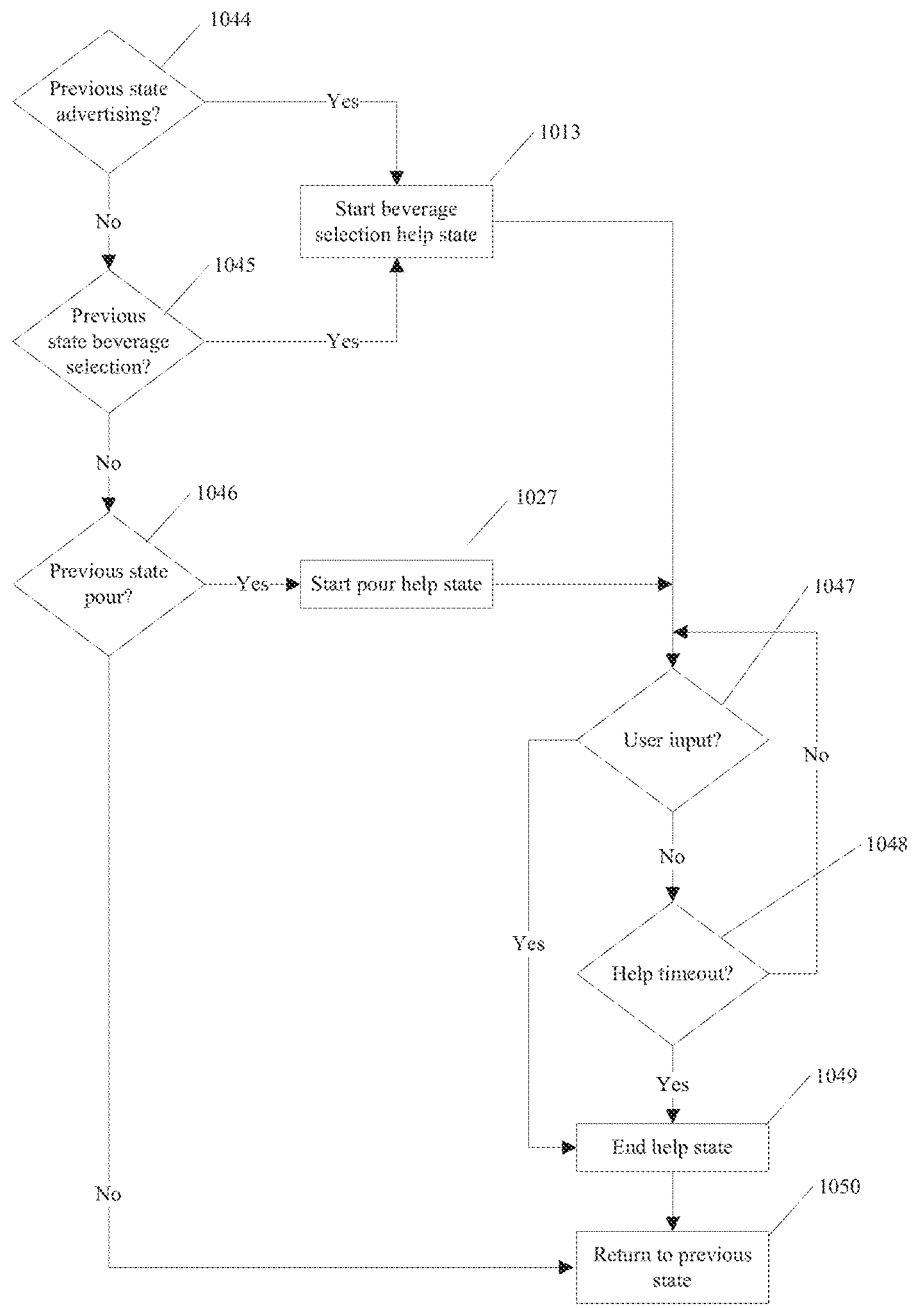
FIG. 22 is a flow chart illustrating the operation of the help states for the beverage dispensing system.

FIG. 22 is a flow chart illustrating the interaction between the touch-sensitive display controller 202, the touch-sensitive display 300, and the timing program located within the memory 213 when the beverage dispensing system 50 executes the help state. The touch-sensitive display controller 202 begins in step 1044 and determines whether the beverage dispensing system 50 was previously in the advertising state. If the beverage dispensing system was previously in the advertising state, the touch-sensitive display controller 202 proceeds to step 1013, otherwise, the touch-sensitive display controller 202 continues to step 1045. In step 1045, the touch-sensitive display controller 202 determines whether the beverage dispensing system 50 was previously in the beverage selection state. If the beverage dispensing system 50 was not previously in the beverage selection state the touch-sensitive display 202 proceeds to step 1046, otherwise, the beverage dispensing system 50 was previously in the beverage selection state and the touch-sensitive display controller 202 proceeds to step 1013 and begins the beverage selection help state. In particular, the touch-sensitive display controller 202 instructs the touch-sensitive display 300 to display screens such as help screens 803-805 illustrated in FIGS. 8a-8c prior to entering step 1047.

In step 1046, the touch-sensitive display controller 202 determines whether the beverage dispensing system 50 was previously in the pour state. If the beverage dispensing system 50 was not previously in the pour state the touch-sensitive display controller 202 proceeds to step 1050, otherwise, the beverage dispensing system 50 was previously in the pour state and the touch-sensitive display controller 202 proceeds to step 1027 and begins the pour help state. In particular, the touch-sensitive display controller 202 instructs the touch-sensitive display 300 to display screens such as help screens 806-810 illustrated in FIGS. 9a-9e prior to entering step 1047.

Once the touch-sensitive display controller 202 begins either the beverage selection help state or the pour help state, the touch-sensitive display controller 202 monitors for a help state exit event which is either further input at the touch-sensitive display 300 or the expiration of a help timing program within the memory 213. In step 1047, the touch-sensitive display controller 202 determines whether a user has touched the touch-sensitive display 300. If the user has touched the touch-sensitive display 300, the touch-sensitive display controller 202 proceeds to step 1049, otherwise, the touch-sensitive display controller 202 proceeds to step 1048. At the beginning of either the beverage selection help state or the pour help state, the touch-sensitive display controller 202 starts a help state timer (10 seconds in the preferred embodiment), and, in step 1048, the touch-sensitive display controller 202 monitors for the expiration of the help state timer. If the help state timer has expired, a help timeout has occurred, and the touch-sensitive display controller 202 proceeds to step 1049, otherwise, the touch-sensitive display controller 202 returns to step 1047 for continued monitoring of the touch-sensitive display 300 and the help state timer.

In step 1049, the touch-sensitive display controller 202 ends the current help state (either the beverage selection help state or the pour help state) by ceasing the display of the help screens. The touch-sensitive display controller 202 then proceeds to step 1050 for a return to the previous state—one of the advertising state, the beverage selection state, and the pour state. A return to the advertising state entails a redisplay of the last displayed advertising state screen and execution of step 1000 as previously described. A return to the beverage selection state involves a redisplay of the last displayed beverage selection state screen and execution of step 1008 as previously described. A return to the pour state includes a redisplay of the last displayed pour state screen and execution of step 1021 as previously described.

Figure 23:
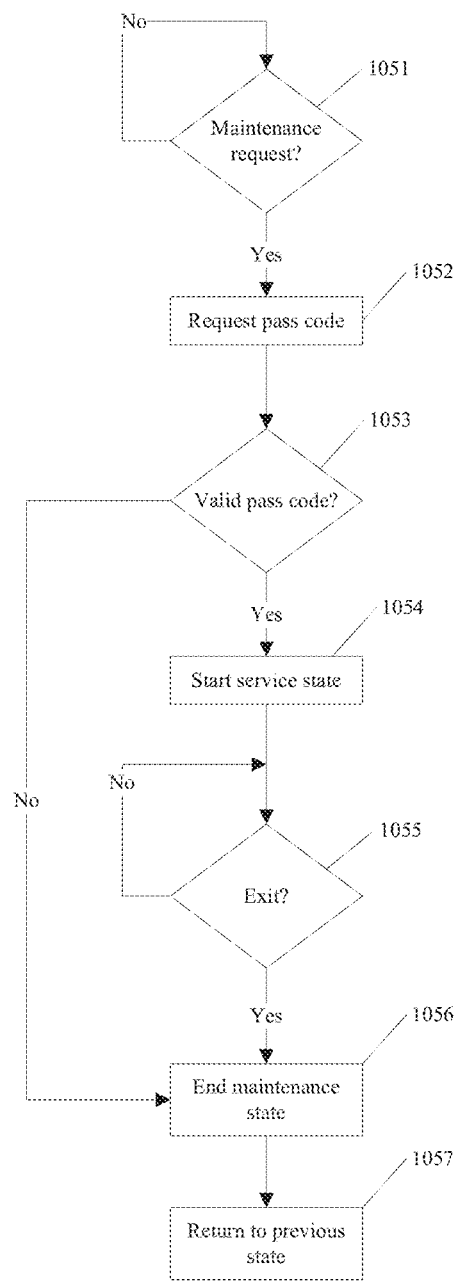
FIG. 23 is a flow chart illustrating the operation of a maintenance state for the beverage dispensing system.

The touch-sensitive display controller 202 continuously monitors the touch-sensitive display 300 for technician input indicating that a technician wishes to enter the maintenance state. FIG. 23 is a flow chart that describes the interaction between the touch-sensitive display controller 202 and the touch-sensitive display 300 when the beverage dispensing system 50 executes the maintenance state. The touch-sensitive display controller 202 begins in step 1051 and monitors the touch-sensitive display 300 for a technician input indicating that the technician wishes to enter the maintenance state. In the preferred embodiment, the output from the touch-sensitive display 300 that will trigger the maintenance state is a touch in any one of the four corners of the touch sensitive display 300. Nevertheless, one of ordinary skill in the art will recognize alternative means such as a maintenance icon. Accordingly, a maintenance state request entails a technician touching the touch sensitive display 300 at any one of its four corners followed by the touch-sensitive display controller 202 determining in step 1051 that one of the four corners has been touched. If the touch-sensitive display controller 202 determines that no maintenance state has been requested the touch-sensitive display controller 202 loops back to step 1051 for continued monitoring of the touch sensitive display 300 for a maintenance request. Otherwise, a maintenance state request has been made, and the touch-sensitive display controller 202 proceeds to step 1052 and outputs a command to the touch-sensitive display 300 to display an access code as illustrated in FIG. 18b. After displaying the access code request, the touch-sensitive display controller 202 continues to step 1053 and determines if a valid pass code has been entered. If a valid pass code has not been entered, the touch-sensitive display controller 202 proceeds to step 1056 and, as described further herein, ends the maintenance state prior to returning to a previous state in step 1057—either the beverage selection state or the pour state. Alternatively, a valid pass code has been entered, and the touch-sensitive display controller 202 continues to step 1054. In step 1054, the touch-sensitive display controller 202 enters the maintenance state and outputs a command to the touch-sensitive display 300 instructing the touch-sensitive display 300 to display the maintenance main menu screen illustrated in FIG. 18a, thereby allowing the technician to select a maintenance icon and perform maintenance as previously described. In addition, the touch-sensitive display controller 202 disables the advertising state as previously described. Once the technician has finished maintenance of the beverage dispensing system 50, the technician exits a selected maintenance screen through touch of a back icon that returns the touch-sensitive display 300 to display the maintenance main menu screen. Consequently, after entering the maintenance state and facilitating performance of maintenance, the touch-sensitive display controller 202 proceeds to step 1055 and monitors the touch-sensitive display 300 for technician input of a maintenance state exit request, which as previously described consists of a technician contacting an exit icon in the main menu. If the technician has not inputted a maintenance state exit request, the touch-sensitive display controller 202 remains in step 1055 for continued monitoring for such a request. Otherwise, a maintenance state exit request has been inputted, and the touch-sensitive display controller 202 proceeds to step 1056.

In step 1056, the touch-sensitive display controller 202 ends the maintenance state by ceasing the display of the maintenance screens as illustrated in FIGS. 18a-18f. The touch-sensitive display controller 202 further enables the advertising state as previously described. The touch-sensitive display controller 202 then proceeds to step 1057 for a return to the previous state—either the beverage selection state or the pour state. A return to the beverage selection state involves a redisplay of the last displayed beverage selection state screen. A return to the pour state includes a redisplay of the last displayed pour state screen.

Although the present invention has been described in terms of the foregoing embodiment, such description has been for exemplary purposes only and, as will be apparent to those of ordinary skill in the art, many alternatives, equivalents, and variations of varying degrees will fail within the scope of the present invention. That scope, accordingly, is not to be limited in any respect by the foregoing description; rather, it is defined only by the claims that follow.

The invention claimed is:

1. A method for a beverage dispensing system, comprising:
    displaying on a touch-sensitive display a beverage selection state, comprising a plurality of three-dimensional graphical representations of cups having thereon drink brand labels of beverage choice selections and movable in a progression through non-beverage selection positions and a beverage selection position;
    registering a user contact with the touch-sensitive display at one of the plurality of three-dimensional graphical representations of cups;
    processing the user contact to determine whether the user contact is a stationary contact whereby the user taps the touch-sensitive display at one of the plurality of three-dimensional graphical representations of cups or a moving contact whereby the user traverses the touch-sensitive display among the non-beverage selection positions and the beverage selection position while maintaining contact with the touch-sensitive display;
    determining in response to a moving contact a starting point of the user contact and an ending point of the user contact among the non-beverage selection positions and the beverage selection position;
    progressing a contacted cup from the starting point of the user contact to the ending point of the user contact, thereby moving the contacted cup among the non-beverage selection positions and the beverage selection position; and
    saving a contacted cup as a beverage choice selection when the user contact is a stationary contact and the contacted cup resides at the beverage selection position.

2. The method for a beverage dispensing system according to claim 1, further comprising progressing a contacted cup from a non-beverage selection position to the beverage selection position when the contact is a stationary contact and the contacted cup resides at a non-beverage selection position.

3. The method for a beverage dispensing system according to claim 1, further comprising:
    ceasing the display of the beverage selection state on the touch-sensitive display responsive to the beverage choice selection;
    displaying on the touch-sensitive display a pour state, comprising the three-dimensional graphical representation of the contacted cup having thereon the drink brand label of the beverage choice selection and a graphical representation for a pour button;
    registering a contact with the touch-sensitive display at the graphical representation of the pour button; and
    delivering the beverage choice selection from the beverage dispensing system in response to the contact with the graphical representation for the pour button.

4. The method for a beverage dispensing system according to claim 3, wherein:
    the pour state further comprises at least one additive icon;
    registering a contact with the touch-sensitive display at the additive icon;
    displaying on the touch-sensitive display the additive icon circling the three-dimensional graphical representation of the contacted cup in response to the contact with the additive icon; and
    delivering the beverage choice selection and additive from the beverage dispensing system in response to the contact with the graphical representation for the pour button.

5. The method for a beverage dispensing system according to claim 1, further comprising:
    ceasing the display of the beverage selection state on the touch-sensitive display in response to an expiration of a beverage choice selection time period;
    displaying on the touch-sensitive display a beverage selection help state, comprising:
        a plurality of three-dimensional graphical representations of cups having thereon drink brand labels of beverage choice selections and movable in a progression through non-beverage selection positions and a beverage selection position, and
        a three-dimensional graphical representation of a hand;
    displaying on the touch-sensitive display the hand contacting one of the plurality of three-dimensional graphical representations of cups located at a non-beverage selection position; and
    progressing the hand and the contacted cup from the non-beverage selection position to the beverage selection position.

6. The method for a beverage dispensing system according to claim 5, further comprising displaying the hand and the contacted cup at the beverage selection position, thereby demonstrating a beverage choice selection.

7. The method for a beverage dispensing system according to claim 3, further comprising:
    ceasing to display the pour state on the touch-sensitive display in response to an expiration of a pour time period;
    displaying on the touch-sensitive display a pour help state, comprising:
        the three-dimensional graphical representation of the contacted cup having thereon the drink brand label of the beverage choice selection,
        a graphical representation for a pour button, and
        a three-dimensional graphical representation of a hand; and
    displaying on the touch sensitive display the hand contacting the graphical representation for the pour button, thereby demonstrating a beverage choice selection pour.

8. The method for a beverage dispensing system according to claim 4, further comprising:
    ceasing the display of the pour state on the touch-sensitive display in response to an expiration of a pour time period;
    displaying on the touch-sensitive display a pour help state, comprising:
        the three-dimensional graphical representation of the contacted cup having thereon the drink brand label of the beverage choice selection,
        a graphical representation for a pour button,
        at least one additive icon, and
        a three-dimensional graphical representation of a hand;
    displaying on the touch sensitive display the hand contacting the additive icon; and displaying on the touch-sensitive display the additive icon circling the three-dimensional graphical representation of the contacted cup, thereby demonstrating an additive selection.

9. The method for a beverage dispensing system according to claim 1, further comprising displaying an advertising state on the touch-sensitive display in response to a proximity sensor indicating a user is not present at the beverage dispensing system.

10. The method for a beverage dispensing system according to claim 1, further comprising pressing interface buttons electrically connected with the control system and located below the touch-sensitive display to operate the beverage dispensing system when a user is unable to reach the touch-sensitive display.

11. The method for a beverage dispensing system according to claim 1, further comprising:
registering a contact with the touch-sensitive display at a maintenance request area of the touch-sensitive display; and
displaying a maintenance state on the touch-sensitive display in response to the contact with the maintenance request area.

12. A method for a beverage dispensing system, comprising:
displaying on a touch-sensitive display a beverage selection state, comprising beverage choice selection icons movable in a progression through non-beverage selection positions and a beverage selection position;
ceasing to display on the touch-sensitive display the beverage selection state in response to an expiration of a beverage choice selection time period;
displaying on the touch-sensitive display a beverage selection help state, comprising beverage choice selection icons movable in a progression through non-beverage selection positions and a beverage selection position and a three-dimensional graphical representation of a hand;
displaying on the touch-sensitive display the hand contacting a beverage choice selection icon located at a non-beverage selection position; and
progressing on the touch sensitive display the hand and the contacted beverage choice selection icon from the non-beverage selection position to the beverage selection position.

13. The method for a beverage dispensing system according to claim 12, further comprising displaying on the touch sensitive display the hand and the contacted beverage choice selection icon at the beverage selection position, thereby demonstrating a beverage choice selection.

14. The method for a beverage dispensing system according to claim 12, further comprising:
registering a contact with the touch-sensitive display at one of the beverage choice selection icons;
processing the contact to determine whether the contact is a stationary contact or a moving contact;
determining in response to a moving contact a starting point of the contact and an ending point of the contact among the non-beverage selection positions and the beverage selection position;
progressing on the touch sensitive display a contacted beverage choice selection icon from the starting point of the contact to the ending point of the contact, thereby moving the contacted beverage choice selection icon among the non-beverage selection positions and the beverage selection position, and saving a contacted beverage choice selection icon as a beverage choice selection when the contact is a stationary contact and the contacted beverage choice selection icon resides at the beverage selection position.

15. The method for a beverage dispensing system according to claim 13, further comprising progressing on the touch sensitive display a contacted beverage choice selection icon from a non-beverage selection position to the beverage selection position when the contact is a stationary contact and the contacted beverage choice selection icon resides at a non-beverage selection position.

16. The method for a beverage dispensing system according to claim 13, further comprising:
ceasing to display on the touch-sensitive display the beverage selection state in response to the beverage choice selection;
displaying on the touch-sensitive display a pour state, comprising the contacted beverage choice selection icon and a graphical representation for a pour button;
ceasing to display on the touch-sensitive display the pour state in response to an expiration of a pour time period;
displaying on the touch-sensitive display a pour help state comprising the contacted beverage choice selection icon, a graphical representation for a pour button, and a three-dimensional graphical representation of a hand; and
displaying on the touch sensitive display the hand contacting the graphical representation for the pour button, thereby demonstrating a beverage choice selection pour.

17. The method for a beverage dispensing system according to claim 16, further comprising:
the pour state and the pour help state each further comprise at least one additive icon;
ceasing to display on the touch-sensitive display the pour state in response to an expiration of a pour time period;
displaying on the touch-sensitive display the pour help state;
displaying on the touch sensitive display the hand contacting the additive icon; and
displaying on the touch-sensitive display the additive icon circling the contacted the contacted beverage choice selection icon, thereby demonstrating an additive selection.

18. The method for a beverage dispensing system according to claim 16, further comprising:
registering a contact with the touch-sensitive display at the graphical representation of the pour button; and
delivering from the beverage dispensing system the beverage choice selection in response to the contact with the graphical representation for the pour button.

19. The method for a beverage dispensing system according to claim 17, further comprising:
registering a contact with the touch-sensitive display at the additive icon;
displaying on the touch-sensitive display the additive icon circling the contacted beverage choice selection icon in response to the contact with the additive icon; and
delivering from the beverage dispensing system the beverage choice selection and additive in response to the contact with the graphical representation for the pour button.

20. A beverage dispensing system, comprising:
a touch-sensitive display adapted to display a beverage selection state, comprising a plurality of three-dimensional graphical representations of cups having thereon drink brand labels of beverage choice selections and movable in a progression through non-beverage selection positions and a beverage selection position; and a control system electrically connected with the touch-sensitive display, wherein the control system:

controls the touch sensitive display to display the beverage selection state, registers a user contact with the touch-sensitive display at one of the plurality of three-dimensional graphical representations of cups, processes the user contact to determine whether the contact is a stationary contact whereby the user taps the touch-sensitive display at one of the plurality of three-dimensional graphical representations of cups or a moving contact whereby the user traverses the touch-sensitive display among the non-beverage selection positions and the beverage selection position while maintaining contact with the touch-sensitive display, determines in response to a moving contact a starting point of the user contact and an ending point of the user contact among the non-beverage selection positions and the beverage selection position, controls the touch sensitive display to progress a contacted cup from the starting point of the user contact to the ending point of the user contact, thereby moving the contacted cup among the non-beverage selection positions and the beverage selection position, and saves a contacted cup as a beverage choice selection when the user contact is a stationary contact and the contacted cup resides at the beverage selection position.

21. The beverage dispensing system according to claim 20, wherein the control system controls the touch sensitive display to progress a contacted cup from a non-beverage selection position to the beverage selection position when the contact is a stationary contact and the contacted cup resides at a non-beverage selection position.

22. The beverage dispensing system according to claim 20, wherein the control system:

controls the touch-sensitive display to cease displaying the beverage selection state in response to the beverage choice selection;

controls the touch-sensitive display to display a pour state, comprising the three-dimensional graphical representation of the contacted cup having thereon the drink brand label of the beverage choice selection and a graphical representation for a pour button;

registers a contact with the touch-sensitive display at the graphical representation of the pour button; and controls the beverage dispensing system to deliver the beverage choice selection in response to the contact with the graphical representation for the pour button.

23. The beverage dispensing system according to claim 22, wherein:

the pour state further comprises at least one additive icon; and the control system:

registers a contact with the touch-sensitive display at the additive icon;

controls the touch-sensitive display to display the additive icon circling the three-dimensional graphical representation of the contacted cup in response to the contact with the additive icon; and controls the beverage dispensing system to deliver the beverage choice selection and additive in response to the contact with the graphical representation for the pour button.

24. The beverage dispensing system according to claim 20, wherein the control system:

controls the touch-sensitive display to cease displaying the beverage selection state in response to an expiration of a beverage choice selection time period;

controls the touch-sensitive display to display a beverage selection help state, comprising:

a plurality of three-dimensional graphical representations of cups having thereon drink brand labels of beverage choice selections and movable in a progression through non-beverage selection positions and a beverage selection position, and a three-dimensional graphical representation of a hand;

controls the touch-sensitive display to display the hand contacting one of the plurality of three-dimensional graphical representations of cups located at a non-beverage selection position; and controls the touch sensitive display to progress the hand and the contacted cup from the non-beverage selection position to the beverage selection position.

25. The beverage dispensing system according to claim 24, wherein the control system controls the touch sensitive display to display the hand and the contacted cup at the beverage selection position, thereby demonstrating a beverage choice selection.

26. The beverage dispensing system according to claim 22, wherein the control system:

controls the touch-sensitive display to cease displaying the pour state in response to an expiration of a pour time period;

controls the touch-sensitive display to display a pour help state, comprising:

the three-dimensional graphical representation of the contacted cup having thereon the drink brand label of the beverage choice selection, a graphical representation for a pour button, and a three-dimensional graphical representation of a hand; and controls the touch sensitive display to display the hand contacting the graphical representation for the pour button, thereby demonstrating a beverage choice selection pour.

27. The beverage dispensing system according to claim 23, wherein the control system:

controls the touch-sensitive display to cease displaying the pour state in response to an expiration of a pour time period;

controls the touch-sensitive display to display a pour help state, comprising:

the three-dimensional graphical representation of the contacted cup having thereon the drink brand label of the beverage choice selection, a graphical representation for a pour button, at least one additive icon, and a three-dimensional graphical representation of a hand;

controls the touch sensitive display to display the hand contacting the additive icon; and controls the touch-sensitive display to display the additive icon circling the three-dimensional graphical representation of the contacted cup, thereby demonstrating an additive selection.

28. The beverage dispensing system according to claim 20, further comprising a proximity sensor electrically connected with the control system, wherein the control system controls the controls the touch-sensitive display to display an advertising state in response to the proximity sensor indicating a user is not present at the beverage dispensing system.

29. The beverage dispensing system according to claim 20, further comprising interface buttons electrically connected with the control system and located below the touch-sensitive display to allow a user unable to reach the touch-sensitive display to operate the beverage dispensing system.

30. The beverage dispensing system according to claim 20, wherein the control system:
registers a contact with the touch-sensitive display at a maintenance request area of the touch-sensitive display; and
controls the touch-sensitive display to display a maintenance state in response to the contact with the maintenance request area.

31. A beverage dispensing system, comprising:
a touch-sensitive display adapted to display a beverage selection state and a beverage selection help state, wherein the beverage selection state comprises beverage choice selection icons movable in a progression through non-beverage selection positions and a beverage selection position, further wherein the beverage selection help state comprises beverage choice selection icons movable in a progression through non-beverage selection positions and a beverage selection position and a three-dimensional graphical representation of a hand; and
a control system electrically connected with the touch-sensitive display, wherein the control system:
controls the touch sensitive display to display the beverage selection state,
controls the touch-sensitive display to cease displaying the beverage selection state in response to an expiration of a beverage choice selection time period,
controls the touch-sensitive display to display the beverage selection help state, wherein the touch-sensitive display displays the hand contacting a beverage choice selection icon located at a non-beverage selection position, and
controls the touch sensitive display to progress the hand and the contacted beverage choice selection icon from the non-beverage selection position to the beverage selection position.

32. The beverage dispensing system according to claim 31, wherein the control system controls the touch sensitive display to display the hand and the contacted beverage choice selection icon at the beverage selection position, thereby demonstrating a beverage choice selection.

33. The beverage dispensing system according to claim 31, wherein the control system:
registers a contact with the touch-sensitive display at one of the beverage choice selection icons;
processes the contact to determine whether the contact is a stationary contact or a moving contact;
determines in response to a moving contact a starting point of the contact and an ending point of the contact among the non-beverage selection positions and the beverage selection position;
controls the touch sensitive display to progress a contacted beverage choice selection icon from the starting point of the contact to the ending point of the contact, thereby moving the contacted beverage choice selection icon among the non-beverage selection positions and the beverage selection position, and
saves a contacted beverage choice selection icon as a beverage choice selection when the contact is a stationary contact and the contacted beverage choice selection icon resides at the beverage selection position.

34. The beverage dispensing system according to claim 33, wherein the control system controls the touch sensitive display to progress a contacted beverage choice selection icon from a non-beverage selection position to the beverage selection position when the contact is a stationary contact and the contacted beverage choice selection icon resides at a non-beverage selection position.

35. The beverage dispensing system according to claim 33, wherein:
the touch-sensitive display is adapted to display a pour state and a pour help state, wherein the pour state comprises the contacted beverage choice selection icon and a graphical representation for a pour button, further wherein the pour help state comprises the contacted beverage choice selection icon, a graphical representation for a pour button, and a three-dimensional graphical representation of a hand; and
the control system:
controls the touch-sensitive display to cease displaying the beverage selection state in response to the beverage choice selection,
controls the touch-sensitive display to display the pour state,
controls the touch-sensitive display to cease displaying the pour state in response to an expiration of a pour time period,
controls the touch-sensitive display to display the pour help state, and
controls the touch sensitive display to display the hand contacting the graphical representation for the pour button, thereby demonstrating a beverage choice selection pour.

36. The beverage dispensing system according to claim 35, wherein:
the pour state and the pour help state each further comprise at least one additive icon; and
the control system:
controls the touch-sensitive display to cease displaying the pour state in response to an expiration of a pour time period,
controls the touch-sensitive display to display the pour help state,
controls the touch sensitive display to display the hand contacting the additive icon, and
controls the touch-sensitive display to display the additive icon circling the contacted the contacted beverage choice selection icon, thereby demonstrating an additive selection.

37. The beverage dispensing system according to claim 35, wherein the control system:
registers a contact with the touch-sensitive display at the graphical representation of the pour button; and
controls the beverage dispensing system to deliver the beverage choice selection in response to the contact with the graphical representation for the pour button.

38. The beverage dispensing system according to claim 36, wherein the control system:
registers a contact with the touch-sensitive display at the additive icon;

controls the touch-sensitive display to display the additive icon circling the contacted beverage choice selection icon in response to the contact with the additive icon; and controls the beverage dispensing system to deliver the beverage choice selection and additive in response to the contact with the graphical representation for the pour button.

\* \* \* \* \*